(12) United States Patent
Yang et al.

(10) Patent No.: US 11,714,307 B2
(45) Date of Patent: Aug. 1, 2023

(54) DISPLAY DEVICE AND MANUFACTURING METHOD OF DISPLAY DEVICE

(71) Applicants: HEFEI BOE OPTOELECTRONICS TECHNOLOGY CO, LTD., Anhui (CN); BOE TECHNOLOGY GROUP CO., LTD., Beijing (CN)

(72) Inventors: Jie Yang, Beijing (CN); Yuansheng Zang, Beijing (CN); Heng Zhang, Beijing (CN); Sheng Wang, Beijing (CN); Hui Wang, Beijing (CN); Junsheng Chen, Beijing (CN); Feng Qu, Beijing (CN); Yan Wang, Beijing (CN)

(73) Assignees: HEFEI BOE OPTOELECTRONICS TECHNOLOGY CO, LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/789,459

(22) PCT Filed: Aug. 26, 2021

(86) PCT No.: PCT/CN2021/114837
§ 371 (c)(1),
(2) Date: Jun. 27, 2022

(87) PCT Pub. No.: WO2022/052816
PCT Pub. Date: Mar. 17, 2022

(65) Prior Publication Data
US 2023/0056588 A1 Feb. 23, 2023

(30) Foreign Application Priority Data

Sep. 11, 2020 (CN) .......................... 202010951337.6

(51) Int. Cl.
*G02F 1/1339* (2006.01)
*G02F 1/1333* (2006.01)
(Continued)

(52) U.S. Cl.
CPC ...... *G02F 1/133314* (2021.01); *G02F 1/1339* (2013.01); *G02F 1/1368* (2013.01);
(Continued)

(58) Field of Classification Search
CPC ......... G02F 1/136209; G02F 1/133322; G02F 1/133528; G02F 1/1339; G02F 1/136222; G02F 1/1368; G02F 2201/38
See application file for complete search history.

(56) References Cited

U.S. PATENT DOCUMENTS 6,521,539 B1  2/2003  Zhou et al.
2009/0135330 A1  5/2009  Kawase et al.
(Continued)

FOREIGN PATENT DOCUMENTS

CN  106526943 A  3/2017
CN  106684100 A  5/2017
(Continued)

OTHER PUBLICATIONS 106526943 translation (Year: 2017).*
(Continued)

*Primary Examiner* — James A Dudek
(74) *Attorney, Agent, or Firm* — The Webb Law Firm

(57) ABSTRACT

A display device includes a backlight module; a display module located on a light exiting side of the backlight module; and a housing accommodating the backlight module and the display module. The display module includes a display panel including an array substrate and a color film substrate arranged opposite to each other. The color film substrate is located between the array substrate and the (Continued)

backlight module. A first polarizer located on one side of the array substrate away from the color film substrate. A manufacturing method of a display device is also provided.

14 Claims, 10 Drawing Sheets

(51) Int. Cl.
*G02F 1/1335* (2006.01)
*G02F 1/1345* (2006.01)
*G02F 1/1362* (2006.01)
*G02F 1/1368* (2006.01)
*G02F 1/13357* (2006.01)

(52) U.S. Cl.
CPC .... *G02F 1/13452* (2013.01); *G02F 1/133322* (2021.01); *G02F 1/133502* (2013.01); *G02F 1/133514* (2013.01); *G02F 1/133528* (2013.01); *G02F 1/136209* (2013.01); *G02F 1/136222* (2021.01); *G02F 1/1336* (2013.01); *G02F 1/133331* (2021.01); *G02F 2201/38* (2013.01)

(56) References Cited

U.S. PATENT DOCUMENTS

| | | |
|---|---|---|
| 2015/0015826 A1 | 1/2015 | Mizusaki |
| 2016/0133198 A1 | 5/2016 | Jeong et al. |
| 2016/0246404 A1 | 8/2016 | Zhang et al. |
| 2017/0060188 A1 | 3/2017 | Han et al. |
| 2018/0210286 A1 | 7/2018 | Hai |
| 2019/0129229 A1 | 5/2019 | Cui et al. |
| 2019/0129257 A1 | 5/2019 | Wang et al. |
| 2019/0384095 A1 | 12/2019 | Chen |
| 2020/0312251 A1 | 10/2020 | Kim et al. |
| 2020/0381565 A1 | 12/2020 | Yamazaki et al. |
| 2021/0034182 A1 | 2/2021 | Zheng |

FOREIGN PATENT DOCUMENTS

| | | |
|---|---|---|
| CN | 206331209 U | 7/2017 |
| CN | 107728365 A | 2/2018 |
| CN | 108983468 A | 12/2018 |
| CN | 109656042 A | 4/2019 |
| CN | 110112140 A | 8/2019 |
| CN | 110133902 A | 8/2019 |
| CN | 110471208 A | 11/2019 |
| CN | 110488407 A | 11/2019 |
| CN | 110488522 A | 11/2019 |
| CN | 110955356 A | 4/2020 |
| CN | 112909022 A | 6/2021 |
| JP | 2009069720 A | 4/2009 |
| JP | 2020056943 A | 4/2020 |
| WO | 2018120307 A1 | 7/2018 |
| WO | 2018120504 A1 | 7/2018 |

OTHER PUBLICATIONS

CN 106684100 A translation (Year: 2017).*
CN 108983468 A (Year: 2018).*
U.S. Appl. No. 17/412,086 Non-Final Office Action dated Mar. 23, 2022.
U.S. Appl. No. 17/412,086 Notice of Allowance and Fees Due dated Oct. 17, 2022.

* cited by examiner

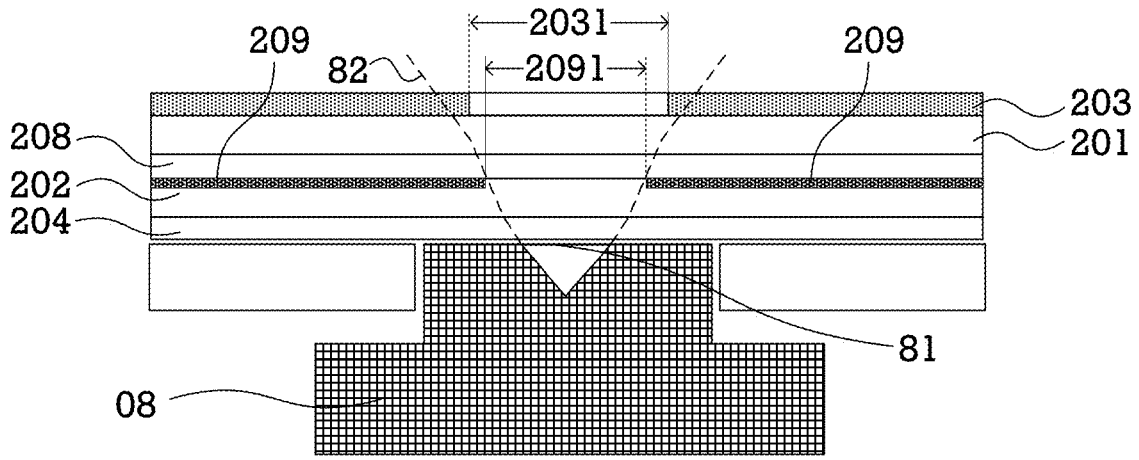

Fig. 24

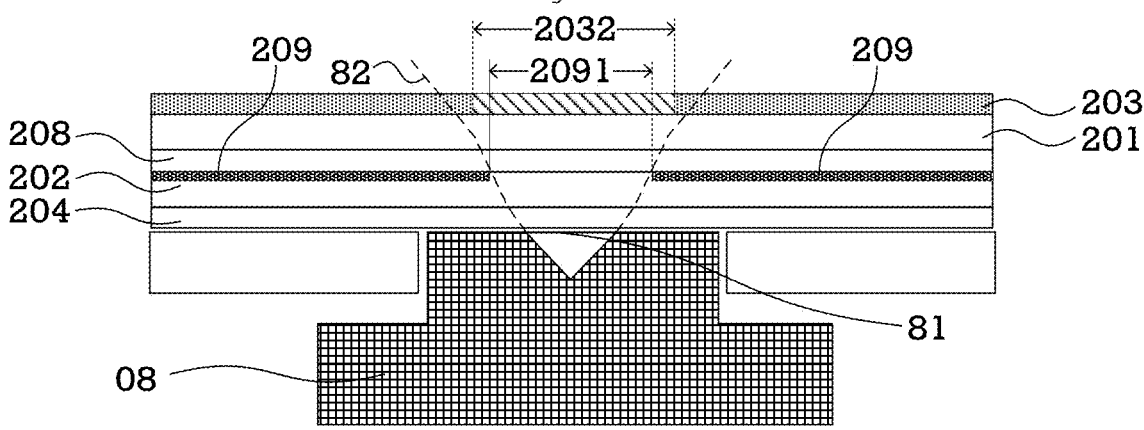

Fig. 25

```
┌─────────────────────────────────────────────────┐
│ Providing a display panel, wherein the display  │
│ panel includes an array substrate and a color film│─S100
│   substrate arranged opposite to each other     │
└─────────────────────────────────────────────────┘
                        ▼
┌─────────────────────────────────────────────────┐
│   Attaching a first polarizer on the array      │
│  substrate, and forming a first light shielding │─S200
│ layer on one side of the array substrate away from│
│           the color film substrate              │
└─────────────────────────────────────────────────┘
                        ▼
┌─────────────────────────────────────────────────┐
│ Binding the driving chip on the array substrate to│
│  which the first polarizer has been attached, and │
│  binding one end of the flexible circuit board to │─S300
│ the array substrate and connecting another end of │
│ the flexible circuit board to the driving circuit │
│      board, so as to form the display module      │
└─────────────────────────────────────────────────┘
                        ▼
┌─────────────────────────────────────────────────┐
│   Providing a housing and a backlight module,   │
│ sequentially mounting the backlight module and the│─S400
│  display module within the housing, and positioning│
│    the color film substrate between the array    │
│         substrate and the backlight module       │
└─────────────────────────────────────────────────┘
```

Fig. 26

DISPLAY DEVICE AND MANUFACTURING METHOD OF DISPLAY DEVICE

CROSS-REFERENCE TO RELATED APPLICATIONS

The present application is a U.S. National Stage Application under 35 U.S.C. § 371 of International Patent Application No. PCT/CN2021/114837, filed on Aug. 26, 2021, which is based on and claims priority to China Patent Application No. 202010951337.6 filed on Sep. 11, 2020, the disclosure of both which are incorporated by reference herein in its entirety.

TECHNICAL FIELD

The present disclosure relates to the field of display technology, and in particular, to a display device and a manufacturing method of a display device.

BACKGROUND

In some notebook computers of the related art, the liquid crystal display device used is mainly composed of a display module and an external frame of a whole machine, wherein the display module includes a display panel, an upper polarizer and a lower polarizer. The display panel includes an array substrate and a color film substrate adhered by a frame sealant, and the upper polarizer and the lower polarizer are respectively attached to the upper color film substrate and the lower array substrate. Since the driving chip is required to be bonded on the array substrate, so that the array substrate goes beyond the color film substrate, the external frame of the whole machine fixes the module unit through the frame at an edge.

With the trend of touch control of notebook computers, in other notebook computers of the related art, the liquid crystal display device used is further added with a protective cover plate, wherein the protective cover plate and the display module are fixed by attachment, and the size of the protective cover plate exceeds that of the display module, with an exceeded portion adhesively fixed to the housing of the whole machine. This structure cancels the design of a lapping jointed portion between the housing and the display module, so that the entire surface of the liquid crystal display device is completely flat, with a more aesthetic appearance. During the touch control operation, the edge portion may not render interference, which is more conducive to the touch control operation.

SUMMARY OF THE INVENTION

According to one aspect of the present disclosure, a display device is provided. The display device includes: a backlight module; a display module located on a light exiting side of the backlight module; and a housing accommodating the backlight module and the display module, herein the display module includes: a display panel including an array substrate and a color film substrate arranged opposite to each other, wherein the color film substrate is located between the array substrate and the backlight module; and a first polarizer located on one side of the array substrate away from the color film substrate.

In some embodiments, the display panel has a display area and a non-display area surrounding the display area, and the display device further includes: a photosensitive unit provided within the housing, and located on one side of the color film substrate away from the array substrate, wherein the photosensitive unit is located in the non-display area.

In some embodiments, the display module further includes: a second light shielding layer located on one side of the photosensitive unit adjacent to the color film substrate, and having a first hollowed-out area, wherein an orthographic projection of the light incident area of the photosensitive unit on the array substrate is at least partially coincident with an orthographic projection of the first hollowed-out area of the second light shielding layer on the array substrate.

In some embodiments, the second light shielding layer includes: an ink light shielding layer on one side of the array substrate away from the color film substrate; or an ink light shielding layer on the surface of one side of the color film substrate adjacent to the photosensitive unit; or a black matrix located within the color film substrate.

In some embodiments, the first polarizer has a second hollowed-out area or a depolarization area, and the orthographic projection of the light incident area of the photosensitive unit on the array substrate or the orthographic projection of the first hollowed-out area of the second light shielding layer on the array substrate is located within an orthographic projection of the second hollowed-out area or the depolarization area of the first polarizer on the array substrate.

In some embodiments, the display panel further includes: a liquid crystal layer located between the array substrate and the color film substrate; and a first frame sealant located between the color film substrate and the array substrate and enclosing the liquid crystal layer.

In some embodiments, the array substrate includes: a first base substrate; a first anti-reflection layer located on the first base substrate; and a first metal layer located on one side of the first anti-reflection layer adjacent to the backlight module, wherein an orthographic projection of the first metal layer on the first base substrate is completely coincident with an orthographic projection of the first anti-reflection layer on the first base substrate, or located within the orthographic projection of the first anti-reflection layer on the first base substrate.

In some embodiments, the display panel has a display area and a non-display area surrounding the display area, the array substrate includes a gate driving circuit located in the non-display area, and the display module also includes: a first light shielding layer located on one side of the array substrate away from the backlight module, wherein an orthographic projection of the first light shielding layer on the array substrate is located in the non-display area, and at least partially covers the gate driving circuit.

In some embodiments, the first light shielding layer includes: an ink printing layer located between the first polarizer and the array substrate, wherein the ink printing layer is in contact with the first polarizer or the array substrate; or an ink printing layer located on one side of the first polarizer away from the array substrate.

In some embodiments, the display panel has a display area and a non-display area surrounding the display area, and the array substrate includes: a first base substrate; a second anti-reflection layer located on the first base substrate; a second metal layer located on one side of the second anti-reflection layer away from the first base substrate; and a gate driving circuit located on one side of the second metal layer away from the first base substrate, wherein the second anti-reflection layer, the second metal layer and the gate driving circuit are all located in the non-display area, and a portion where orthographic projections of the second anti-reflection layer and the second metal layer on the first base substrate are coincident with each other at least partially covers an orthographic projection of the gate driving circuit on the first base substrate.

In some embodiments, the array substrate further includes: a plurality of first thin film transistors located in the display area; and a plurality of second thin film transistors located in the non-display area and adjacent to one row or one column of first thin film transistors among the plurality of first thin film transistors which are located at an edge of the display area, wherein at least one of the plurality of second thin film transistors does not include a drain metal layer or an active layer.

In some embodiments, the housing includes: a rear portion located on one side of the backlight module away from the color film substrate and a plurality of side portions connected to the rear portion, and the plurality of side portions and the rear portion form an inner space of the housing; wherein the array substrate includes: a first portion, wherein an orthographic projection of the first portion on the rear portion is completely or partially coincident with an orthographic projection of the color film substrate on the rear portion; and a second portion, wherein an orthographic projection of the second portion on the rear portion and the orthographic projection of the color film substrate on the rear portion are not coincident with each other, wherein an orthographic projection of the backlight module on the rear portion is completely coincident with an orthographic projection of the array substrate on the rear portion or located within the orthographic projection of the array substrate on the rear portion, and the second portion, the backlight module, the color film substrate and the side portion enclose an accommodating space; and the display module further includes: a flexible circuit board located on one side of the second portion adjacent to the color film substrate, and a driving circuit board electrically connected to the flexible circuit board, wherein the driving circuit board and at least part of the flexible circuit board are arranged within the accommodating space.

According to one aspect of the present disclosure, a manufacturing method of a display device is provided. The method includes: providing a display panel having a display area and a non-display area surrounding the display area, wherein the display panel includes an array substrate and a color film substrate arranged opposite to each other, and the array substrate includes a gate driving circuit located in the non-display area; attaching a first polarizer to the array substrate, and forming a first light shielding layer on one side of the array substrate away from the color film substrate, wherein an orthographic projection of the first light shielding layer on the array substrate is located in the non-display area and at least partially covers the gate driving circuit; binding a driving chip on the array substrate to which the first polarizer has been attached, and binding one end of a flexible circuit board on the array substrate and connecting another end of the flexible circuit board to a driving circuit board to form a display module; and providing a housing and a backlight module, sequentially mounting the backlight module and the display module within the housing, and positioning the color film substrate between the array substrate and the backlight module.

In some embodiments, a step of attaching a first polarizer on the array substrate and forming a first light shielding layer on one side of the array substrate away from the color film substrate includes at least one of step a) to step f): a) printing ink on a surface of one side of the array substrate away from the color film substrate to form an ink printing layer as the first light shielding layer, and attaching the first polarizer on an ink-printed side of the array substrate through an adhesive layer; b) printing ink on a surface of the first polarizer to form an ink printing layer as the first light shielding layer, and attaching an ink-printed side of the first polarizer to a surface of one side of the array substrate away from the color film substrate through an adhesive layer; c) attaching the first polarizer to a surface of one side of the array substrate away from the color film substrate through an adhesive layer, and printing ink on a surface of one side of the first polarizer away from the color film substrate to form an ink printing layer as the first light shielding layer, and then arranging a functional film layer on an ink-printed side of the first polarizer; d) printing ink on a surface of the first polarizer to form an ink printing layer as the first light shielding layer, and providing a functional film layer on an ink-printed side of the first polarizer, and then attaching a surface of one side of the first polarizer away from the functional film layer to a surface of one side of the array substrate away from the color film substrate; e) attaching a substrate including an ink printing layer as the first light shielding layer to a surface of the first polarizer, and attaching a surface of one side of the first polarizer away from the ink printing layer to a surface of one side of the array substrate away from the color film substrate; and f) attaching the first polarizer to a surface of one side of the array substrate away from the color film substrate, and attaching a substrate including an ink printing layer as the first light shielding layer to a surface of one side of the first polarizer away from the array substrate.

In some embodiments, the manufacturing method further includes: arranging the photosensitive unit within the housing, and positioning the photosensitive unit on one side of the color film substrate away from the array substrate; wherein a step of forming the display module further includes: forming a second light shielding layer on one side of the photosensitive unit adjacent to the color film substrate, wherein the second light shielding layer has a first hollowed-out area, and an orthographic projection of the light incident area of the photosensitive unit on the array substrate is at least partially coincident with an orthographic projection of the first hollowed-out area of the second light shielding layer on the array substrate.

In some embodiments, a step of forming the array substrate includes: providing a first base substrate; forming a first anti-reflection layer on the first base substrate; and forming a first metal layer on one side of the first anti-reflection layer away from the first base substrate, wherein an orthographic projection of the first metal layer on the first base substrate is completely coincident with an orthographic projection of the first anti-reflection layer on the first base substrate, or located within the orthographic projection of the first anti-reflection layer on the first base substrate.

In some embodiments, a step of forming the array substrate further includes: forming a second anti-reflection layer on the first base substrate; forming a second metal layer on one side of the second anti-reflection layer away from the first base substrate; and forming a gate driving circuit on one side of the second metal layer away from the first base substrate, wherein the second anti-reflection layer, the second metal layer and the gate driving circuit are all located in the non-display area, a portion where orthographic projections of the second anti-reflection layer and the second metal layer on the first base substrate are coincident with each other at least partially covers an orthographic projection of the gate driving circuit on the first base substrate.

In some embodiments, the first anti-reflection layer and the second anti-reflection layer are prepared by the same patterning process.

BRIEF DESCRIPTION OF THE ACCOMPANYING DRAWINGS

The accompanying drawings which constitute part of this specification, illustrate the exemplary embodiments of the present disclosure, and together with this specification, serve to explain the principles of the present disclosure.

The present disclosure may be more explicitly understood from the following detailed description with reference to the accompanying drawings, in which.

Figure 2:
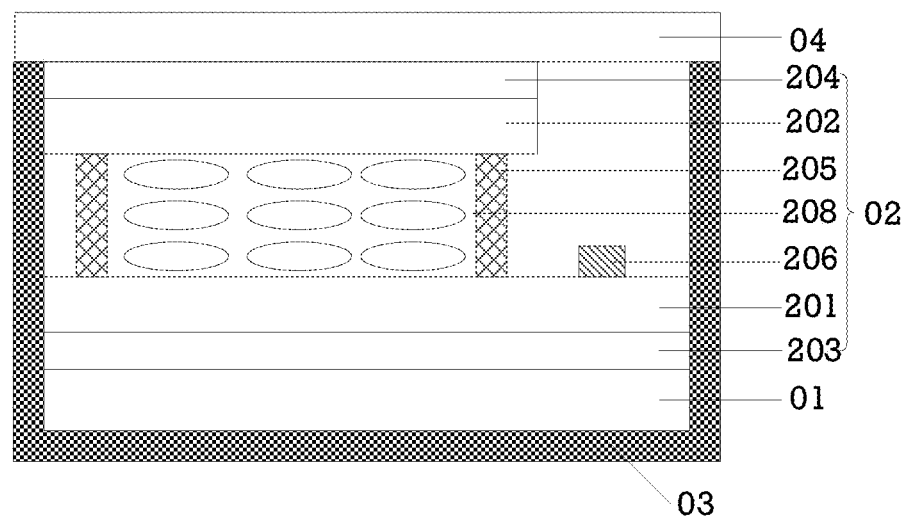
FIG. 2 is a schematic structural view of a liquid crystal display device of another notebook computer in the related art.
Figure 10:
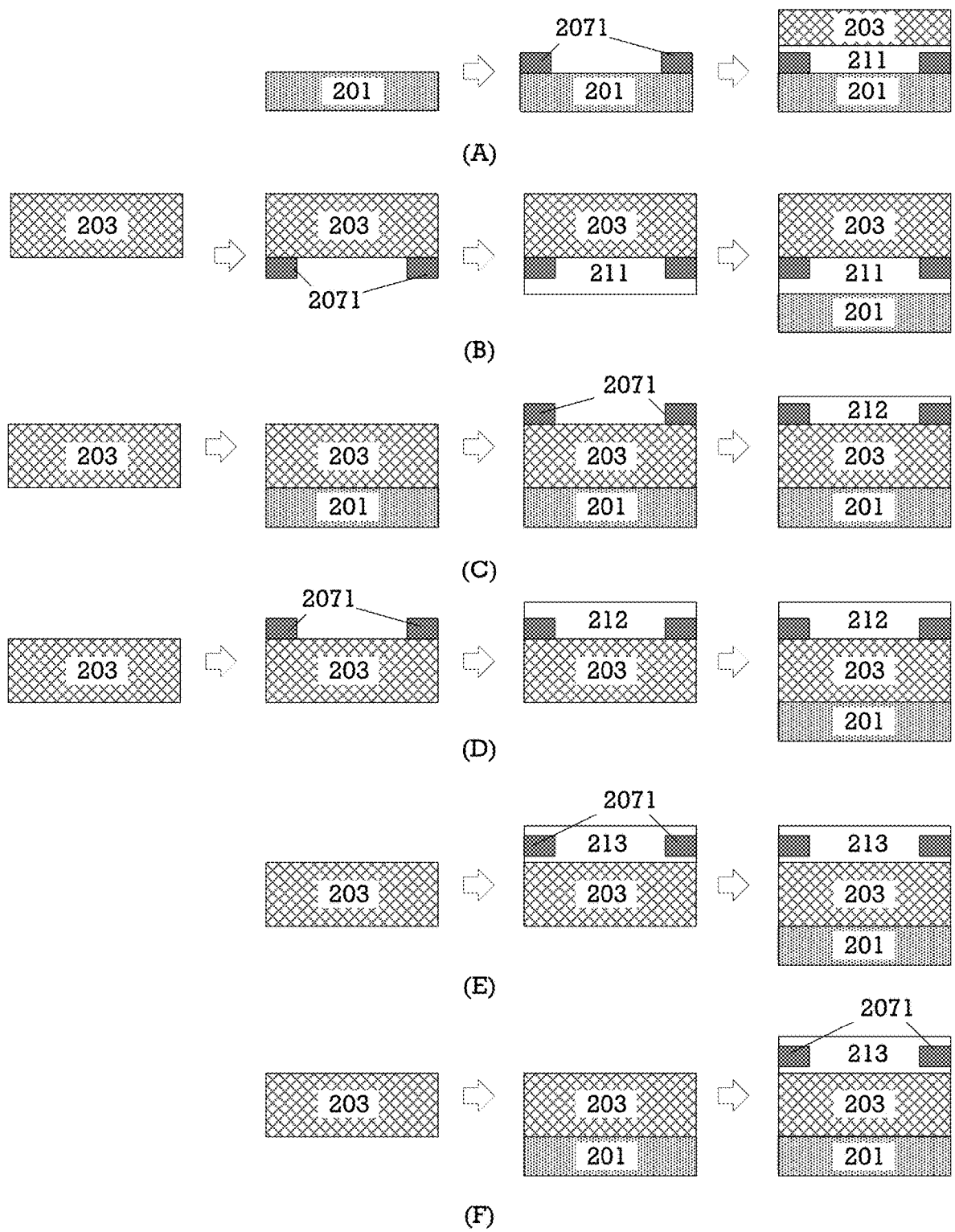
Figure 11:
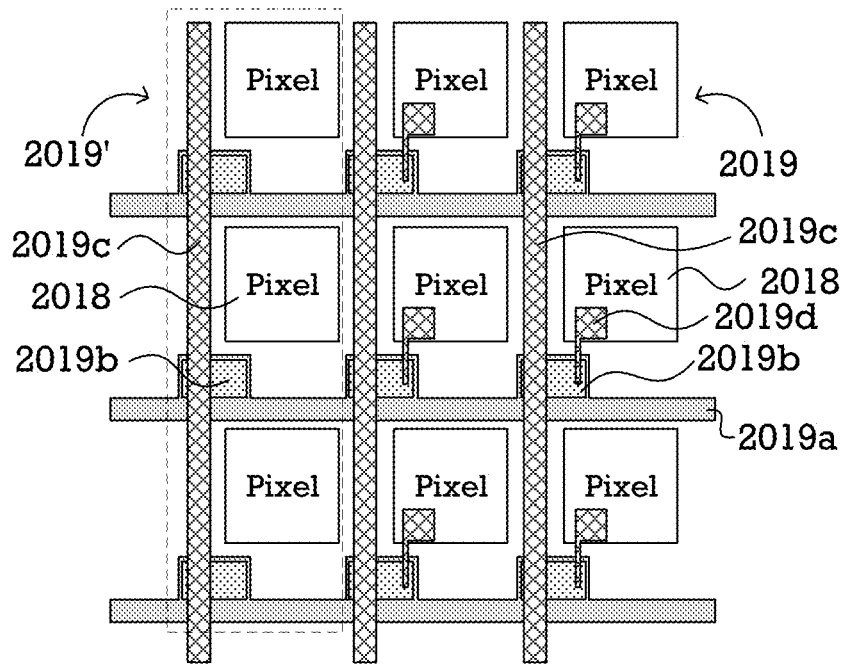
Figure 12:
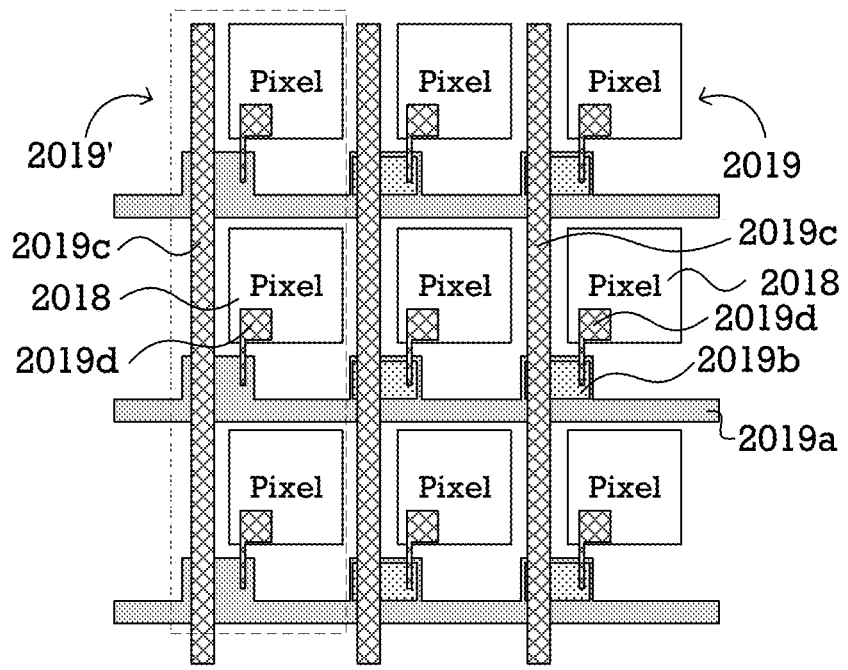
Figure 13:
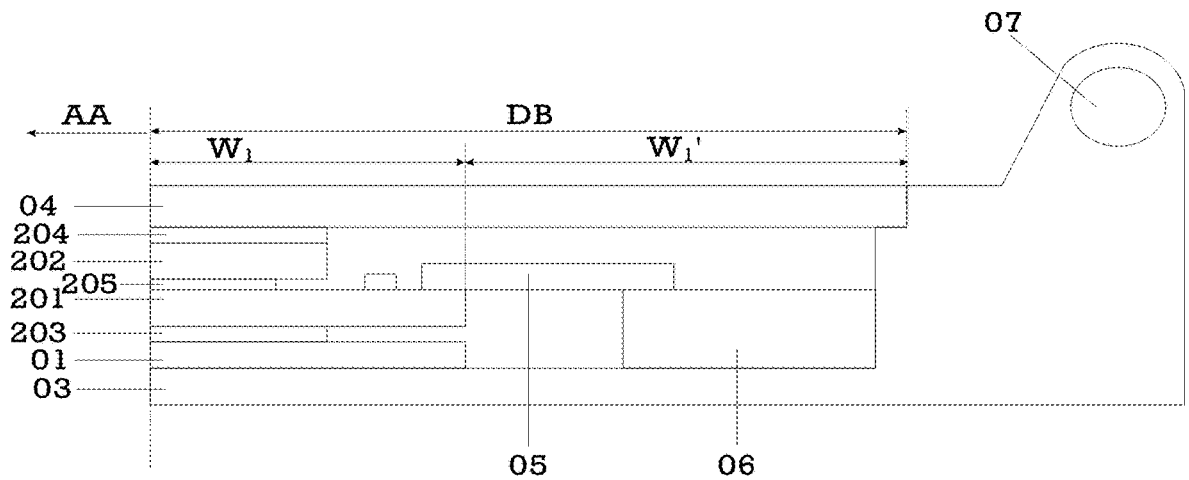
Figure 14:
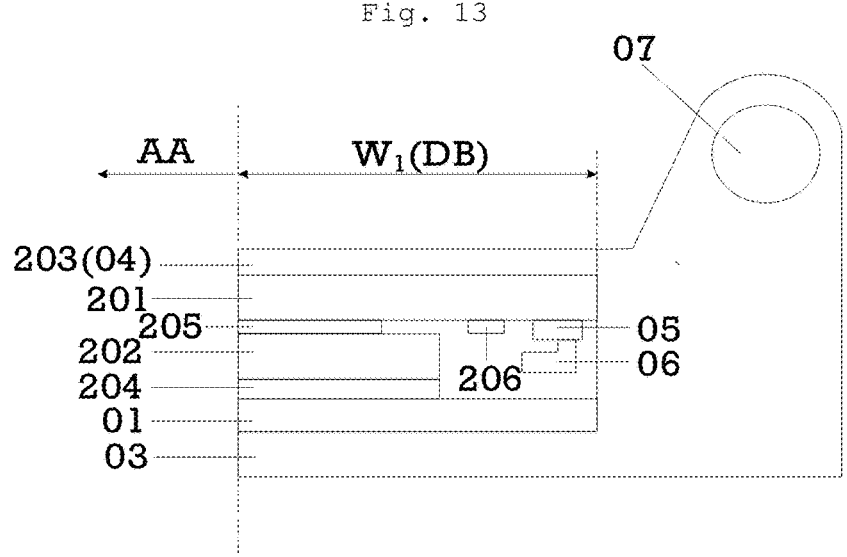
Figure 15:
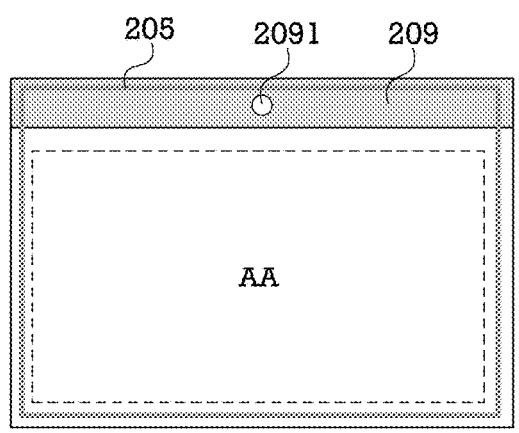
Figure 16:
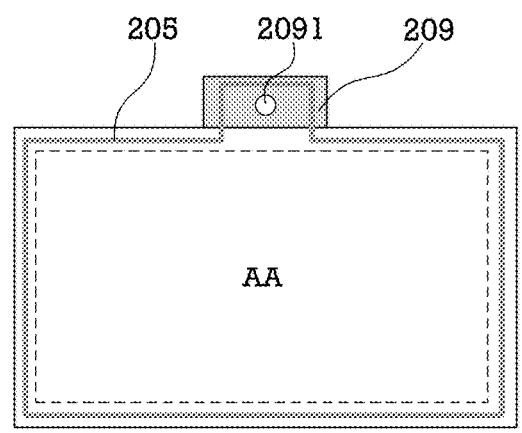
Figure 17:
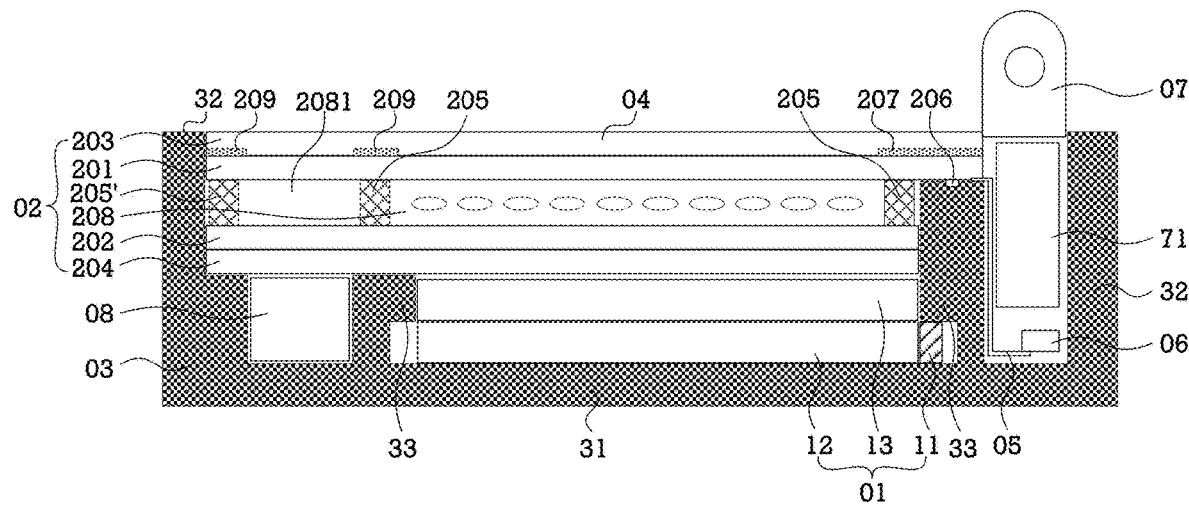
Figure 18:
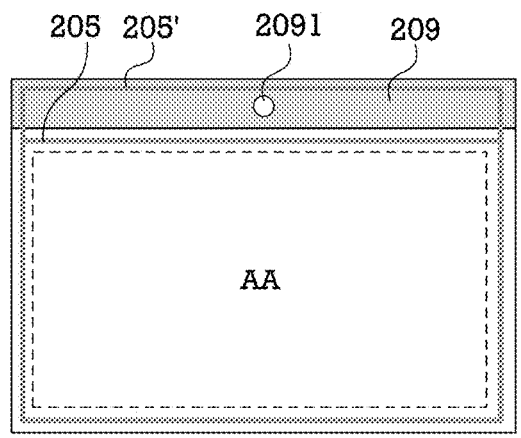
Figure 19:
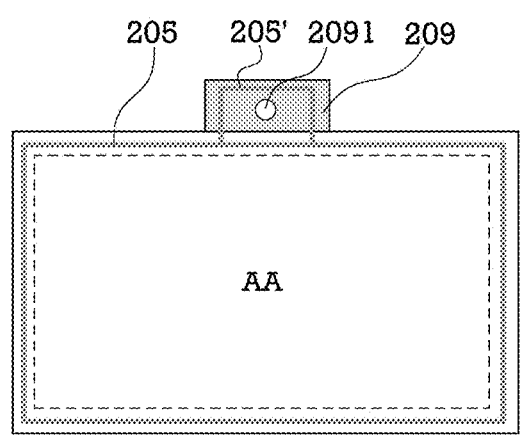
Figure 20:
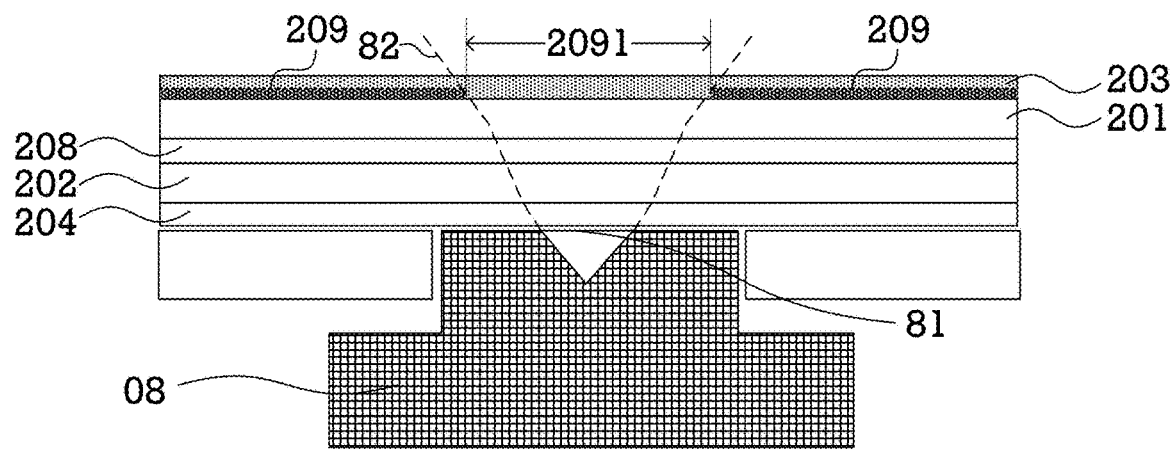
Figure 21:
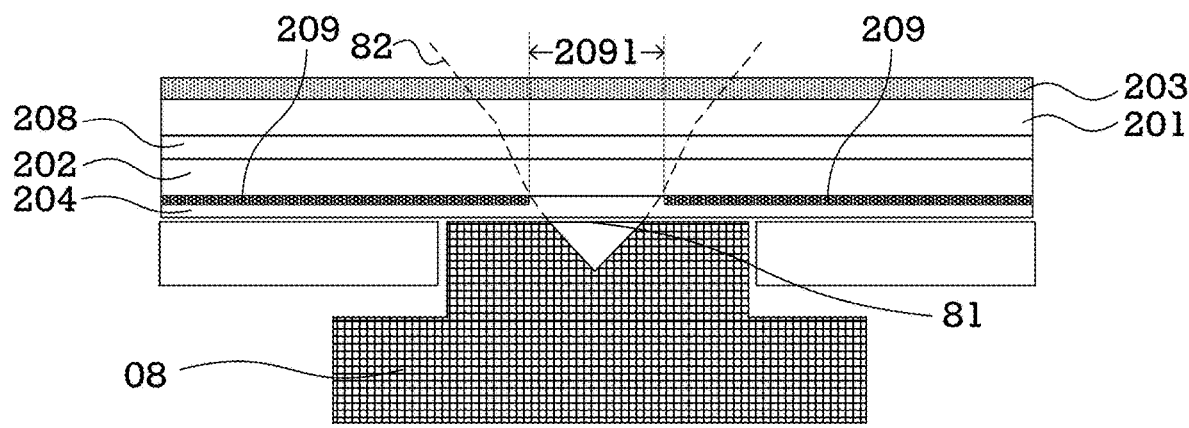
Figure 22:
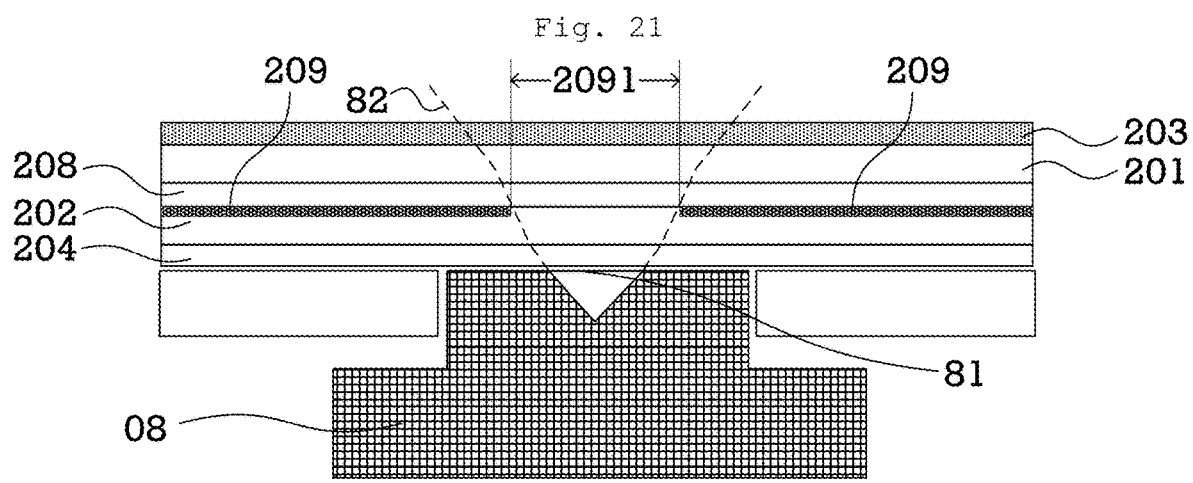
Figure 23:
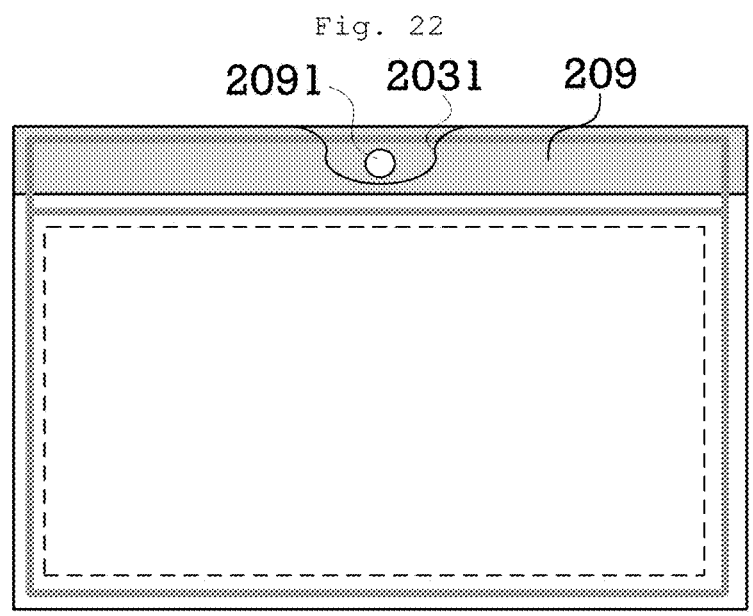

FIGS. 10 (A)-(F) are schematic views of multiple methods for attaching a first polarizer on an array substrate and forming a first light shielding layer during the preparation process in some embodiments of the display device of the present disclosure;

FIGS. 11 and 12 are partially structural schematic views of a display area and a periphery on the array substrate in some embodiments of the display device of the present disclosure respectively;

FIG. 13 is a partially structural schematic view of the display device shown in FIG. 2;

FIG. 14 is a partially structural schematic view in an embodiment of the display device of the present disclosure;

FIGS. 15 and 16 are schematic views of the arrangement of a second light shielding layer and a first frame sealant of the display module in some embodiments of the display device of the present disclosure respectively;

FIG. 17 is a schematic cross-sectional view of still another embodiment of the display device of the present disclosure;

FIGS. 18 and 19 are schematic views of the arrangement of a second light shielding layer, the first frame sealant and a second frame sealant of the display module in some embodiments of the display device of the present disclosure respectively;

FIGS. 20-22 are schematic views of the relative positions of a photosensitive unit and the second light shielding layer in some embodiments of the display device of the present disclosure respectively;

FIG. 23 is a schematic view of the arrangement of the second light shielding layer and a second hollowed-out area of the display module in an embodiment of the display device of the present disclosure;

FIG. 24 is a schematic view of the relative positions of a light incident area, a first hollowed-out area and the second hollowed-out area in an embodiment of the display device of the present disclosure;

FIG. 25 is a schematic view of the relative positions of the light incident area, the first hollowed-out area and the depolarization area in an embodiment of the display device of the present disclosure; and FIG. 26 is a schematic flowchart in an embodiment of a manufacturing method of a display device of the present disclosure.

It should be understood that the sizes of various parts shown in the accompanying drawings are not drawn according to actual proportional relations. In addition, the same or similar components are denoted by the same or similar reference signs.

DETAILED DESCRIPTION

Various exemplary embodiments of the present disclosure will now be described in detail with reference to the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "include" or variants thereof means that the element before the word covers the element(s) listed after the word without excluding the possibility of also covering other elements. The terms "up", "down", "left", "right", or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (including technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

Figure 1:
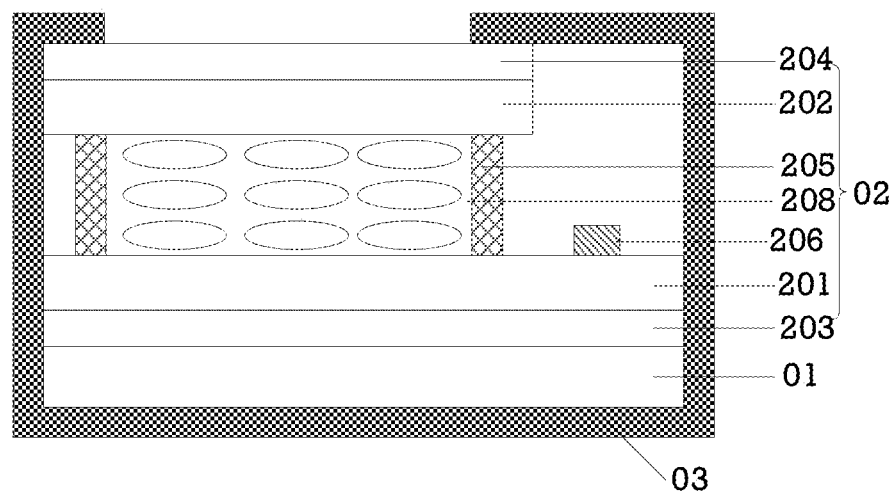
FIG. 1 is a schematic structural view of a liquid crystal display device of a notebook computer in the related art.

As shown in FIG. 1, it is a schematic structural view of a liquid crystal display device of a notebook computer in the related art. The liquid crystal display device is mainly composed of a backlight module 01, a display module 02 and a housing 03 of a whole machine, wherein the display module 02 includes an array substrate 201, a color film substrate 202, a first polarizer 203 attached to the array substrate 201, a second polarizer 204 attached to the color film substrate 202, and a first frame sealant 205 for adhering the array substrate 201 and the color film substrate 202. Since the driving chip 206 is required to be bonded on the array substrate 201, so that the size of the array substrate 201 exceeds that of the color film substrate 202, the housing 03 of a whole machine fixes the backlight module 01 and the display module 02 through the frame at an edge. Because of the requirements of the assembling process, the housing 03 is required to have overlap with the display module 02 to a certain extent, the surrounding frame is relatively large, with a certain level difference at a periphery.

With the touch control trend of notebook computers, the above-described level difference may cause interference between a finger and the frame during touch control, which significantly affects the experience effect of the client. In order to solve the above-described problem, a liquid crystal display device as shown in FIG. 2 is provided, in which a protective cover plate 04 is added on the basis of the liquid crystal display device shown in FIG. 1. The protective cover plate 04 is fixed to the display module 02 by attachment, and the size of the protective cover plate 04 exceeds that of the display module 02, with an exceeded portion adhesively fixed to the housing 03 of a whole machine. Compared with the structure shown in FIG. 1, this structure cancels the design of a lapping jointed portion between the housing 03 and the display module 02, so that the entire surface of the liquid crystal display device is completely flat, with a more aesthetic appearance. Importantly, during the touch control operation, the edge portion may not cause an interference, which is more conducive to the touch control operation. At the same time, the height of the frame of the entire liquid crystal display device is reduced to a certain extent due to the cancellation of a lapping jointed portion between the housing 03 and the display module 02. However, since the protective cover plate 04 in this structure has a high cost, the cost of the entire liquid crystal display device is increased. As the protective cover plate 04 is added, the thickness of the entire liquid crystal display device is also increased. Since the attachment step of the protective cover plate 04 in the whole process is added, the overall process yield is lowered.

Figure 3:
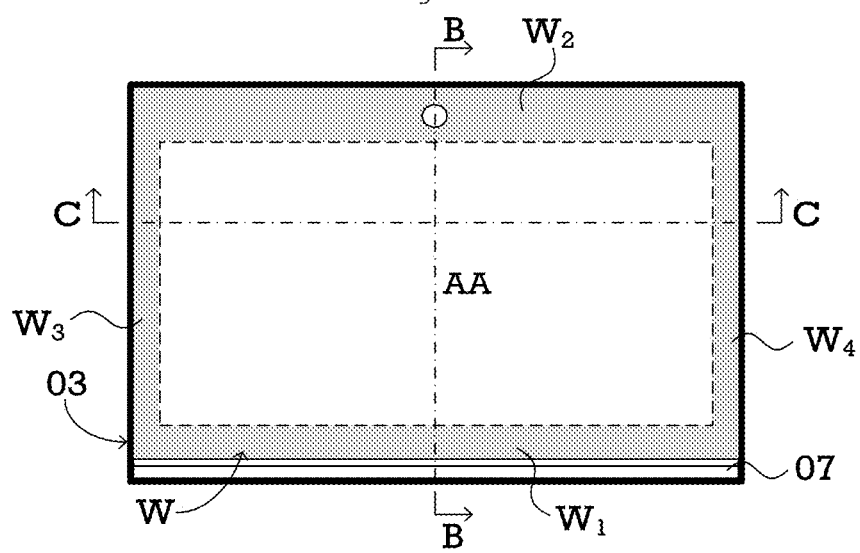
FIG. 3 is a schematic view of an overall structure in an embodiment of the display device of the present disclosure.
Figure 4:
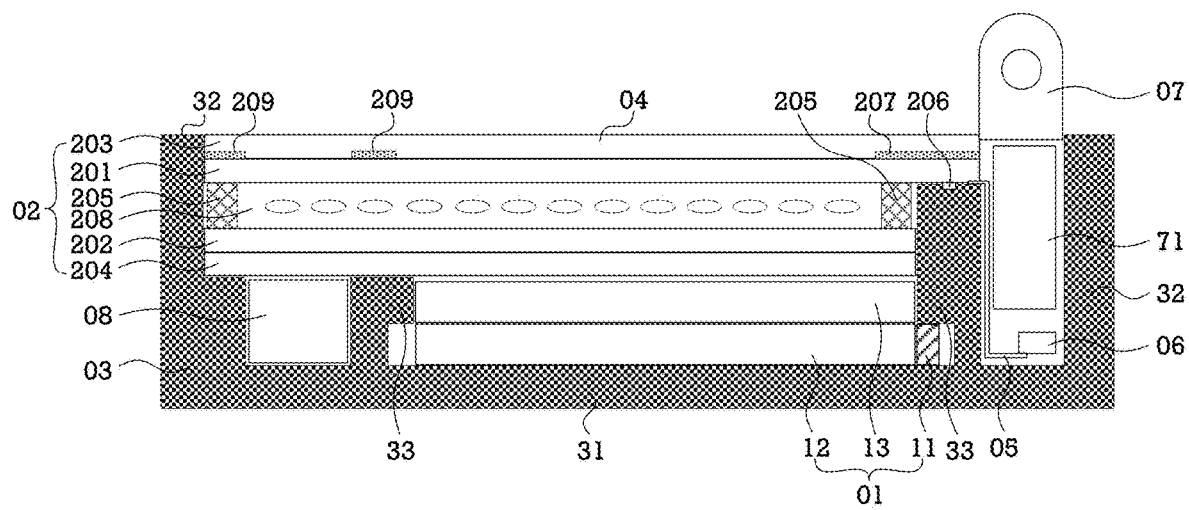
FIG. 4 is a schematic structural view of BB section in FIG. 3.
Figure 5:
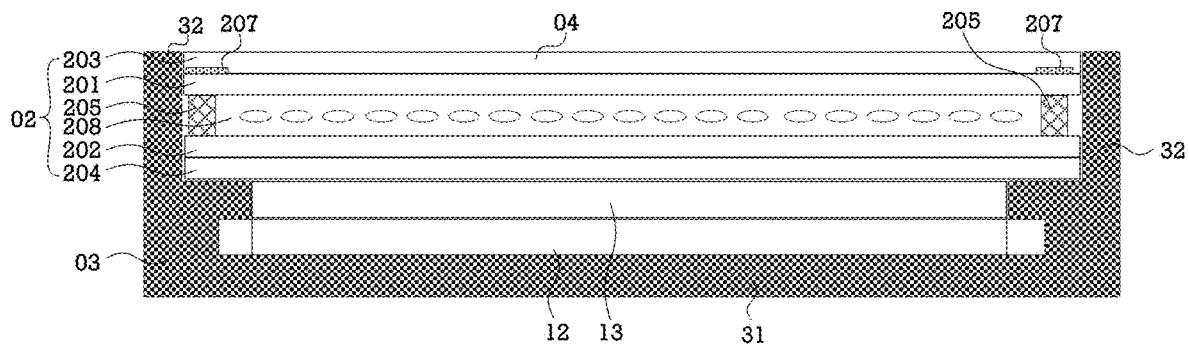
FIG. 5 is a schematic structural view of CC section in FIG. 3.
Figure 6:
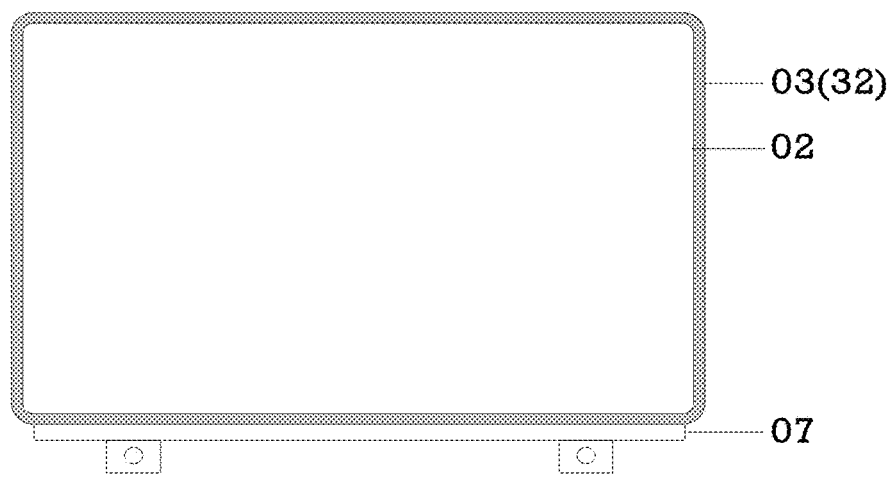
FIG. 6 is a schematic view of an overall structure in another embodiment of the display device of the present disclosure.
Figure 7:
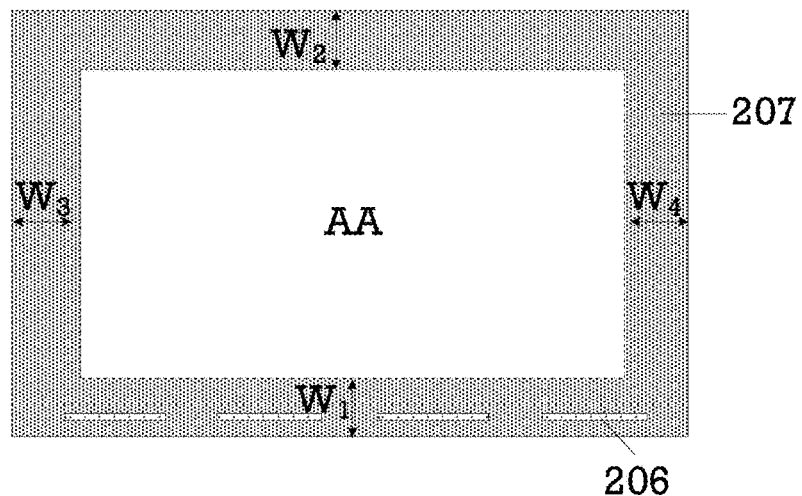
FIG. 7 is a schematic structural view of a display module in an embodiment of the display device of the present disclosure.
Figure 8:
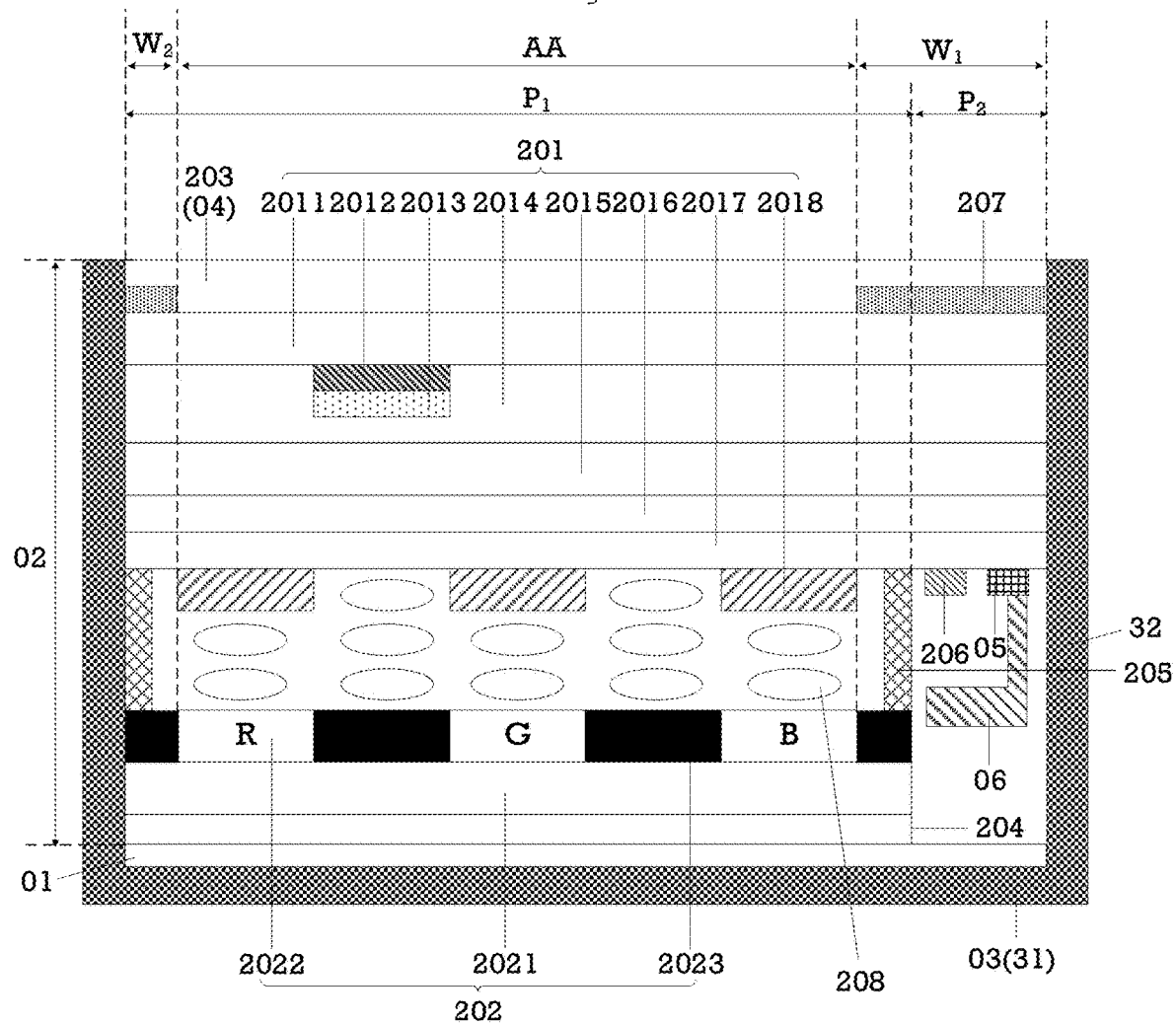
FIG. 8 is a schematic cross-sectional view in an embodiment of the display device of the present disclosure.
Figure 9:
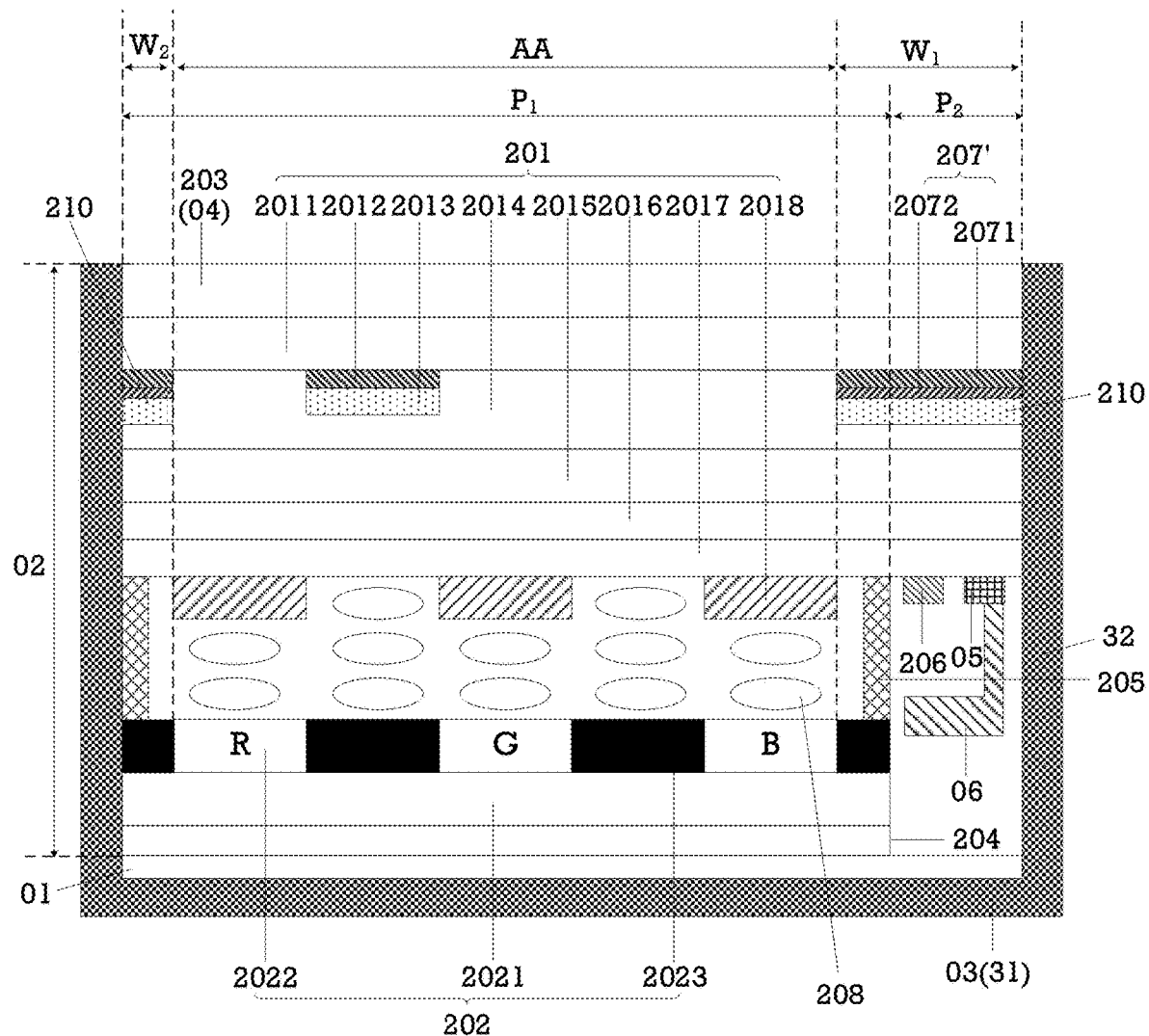
FIG. 9 is a schematic cross-sectional view in another embodiment of the display device of the present disclosure.

FIG. 3 is a schematic view of an overall structure in an embodiment of the display device of the present disclosure. FIG. 4 is a schematic structural view of BB section in FIG. 3. FIG. 5 is a schematic structural view of CC section in FIG. 3. FIG. 6 is a schematic view of an overall structure in another embodiment of the display device of the present disclosure. FIG. 7 is a schematic structural view of a display module in an embodiment of the display device of the present disclosure. FIG. 8 is a schematic cross-sectional view in an embodiment of the display device of the present disclosure. FIG. 9 is a schematic cross-sectional view in another embodiment of the display device of the present disclosure.

Referring to FIGS. 3-9, in some embodiments, the display device includes: a backlight module 01, a display module 02 and a housing 03. The display device may be a notebook computer, and may also be a tablet computer or the like. The backlight module 01 is configured to provide backlight for display to the display module 02, which can be a direct type backlight module or an edge type backlight module. For example, in FIGS. 4 and 5, the backlight module 01 is an edge type backlight module, which may include a lateral light source 11, a light guide plate 12, an optical film assembly 13 and the like. The substrate of the backlight module 01 may be arranged within the housing 03 or formed by multiplexing the housing 03. In other words, the interior wall of the housing 03 not only accommodates and supports the backlight module 01 and the display module 02, but also serves as the base substrate of the backlight module 01 to reduce the size occupied by the backlight module in a thickness direction. The lateral light source 11, the light guide plate 12, the optical film assembly 13 and the like in the backlight module 01 may be accommodated and fixed by a groove structure provided within the housing 03.

In order to save the space occupied by the housing 03 in a transverse direction, referring to FIG. 4, a groove structure is depressed inwardly in a transverse direction (i.e., the concave direction is parallel to the horizontal plane) may be provided within the housing 03 to accommodate members such as the lateral light source 11. In order to facilitate the installation of the lateral light source 11, the lugs 33 forming the groove structure in the housing 03 may be detachably separated from a rear portion 31 (A shell) of the housing 03, so that members such as the lateral light source 11 may be first mounted to the rear portion 31, and then the lugs 33 are mounted. Moreover, the lugs 33 can also support the display module 02 in addition to constraining the components such as the lateral light source that have been mounted.

Referring to FIGS. 4, 5, 8 and 9, the display module 02 is located on a light exiting side of the backlight module 01. The display module 02 includes: a display panel and a first polarizer 203. The display panel 20 includes an array substrate 201 and a color film substrate 202 arranged opposite to each other, and the color film substrate 202 is located between the array substrate 201 and the backlight module 01. The first polarizer 203 is located on one side of the array substrate 201 away from the color film substrate 202. The first polarizer 203 may be multiplexed as the protective cover plate 04 of the display module 02.

In the above-described display device provided by the embodiments of the present invention, the array substrate 201 is flipped upside for use, and cooperates with the first polarizer 203 on the array substrate 201 to be multiplexed as the protective cover plate 04, so as to avoid individual provision of the protective cover plate 04, and thus save the attachment process of the protective cover plate 04, thereby realizing a light and thin display device, simplifying the manufacturing process, and improving the product yield. In addition, by flipping the array substrate, the related elements (such as a driving chip) on the array substrate and the devices connected to the array substrate (for example, a flexible circuit board and a driving circuit board) may be provided on the inner side of the array substrate, thereby realizing integration of the entire display screen, eliminating the level difference between the display module and the housing of a whole machine, and improving the aesthetic effect of the display device.

In FIGS. 4, 5, 8 and 9, the display module 02 may further include a second polarizer 204 located between the color film substrate 202 and the backlight module 01. The display panel may further include a liquid crystal layer 208 located between the array substrate 201 and the color film substrate 202. The light transmission axis of the second polarizer 204 and the light transmission axis of the first polarizer 203 are perpendicular to each other. Since the liquid crystal molecules in the liquid crystal layer have optical rotation properties, polarized light is converted by the first polarizer and the second polarizer with their optical polarization direction perpendicular to each other, thereby realizing the graphic and text display of the display module.

The second polarizer 204 may be formed on the surface of the color film substrate 202, and the orthographic projection of the second polarizer 204 on the color film substrate 202 may are completely coincident with the color film substrate 202. In order to form the liquid crystal layer 208, the display module 02 further includes a first frame sealant 205 located between the color film substrate 202 and the array substrate 201. The first frame sealant 205, the color film substrate 202 and the array substrate 201 jointly enclose a liquid crystal cell. The liquid crystal is injected into the liquid crystal cell to form a liquid crystal layer 208.

In some embodiments, the first polarizer 203 is optionally a high-hardness polarizer (for example, with a slightly larger thickness than a thickness of a conventional polarizer by 0.1 mm) or a high-hardness film to replace the toughened cover plate. Exemplarily, the hardness value of the first polarizer 203 may be greater than or equal to 6H, so that the first polarizer 203 presents a favorable scratch resistance capability. In addition, since the thickness of the protective cover plate 04 in the related art is generally 0.5 mm or 0.7 mm, and the thickness of the optical adhesive layer that attaches the protective cover plate 04 to the display module 02 is about 0.2 mm. Therefore, in this embodiment, when the first polarizer 203 is multiplexed as the protective cover plate 04, the overall thickness of the display device may be reduced by about 0.6 mm-0.8 mm.

In FIGS. 3-6 and 8-9, the housing 03 accommodates the backlight module 01 and the display module 02. The housing 03 may include a rear portion 31 located on one side of the backlight module 01 away from the color film substrate 02 and a plurality of side portions 32 connected to the rear portion 31, wherein the plurality of side portions 32 and the rear portion 31 form the inner space of the housing 03.

Referring to FIGS. 3 and 6, when the display device is watched from the light exiting side of the display device, the side portion 32 surrounds an outer side of the display module 02. Referring to FIGS. 4, 5 and 8, the overall contour of the cross-section of the housing 03 presents a concave shape on the basis of a rectangle. The side portion 32 may be provided as a wall structure with uniform or non-uniform thickness, and may be perpendicular to the rear portion 31. In other embodiments, the side portion 32 may form an acute angle or an obtuse angle with the rear portion 31 so as to form a trapezoidal overall profile with a concave structure.

In the above-described embodiments, the array substrate is internally provided with patterns of a metallic material, for example metal layers such as the gate, the source and the drain of the thin film transistor TFT in the array substrate which are located in the display area. When the array substrate is flipped upside, these metal layers are likely to reflect light under the irradiation of external light. Referring to FIGS. 8 and 9, in some embodiments, the array substrate 201 includes: a first base substrate 2011, a first anti-reflection layer 2012 and a first metal layer 2013. The first base substrate 2011 may be formed of a transparent material such as glass. The first anti-reflection layer 2012 is located on the first base substrate 2011. The first metal layer 2013 is located on one side of the first anti-reflection layer 2012 adjacent to the backlight module.

The pattern shape of the first anti-reflection layer 2012 is the same as that of the first metal layer 2013 required to be shielded by the first anti-reflection layer 2012, and the pattern size of the first anti-reflection layer 2012 may be the same as or different with that of the first metal layer 2013. The first anti-reflection layer 2012 that shields the metal layer 2013 is provided between the first metal layer 2013 and the first base substrate 2011, thereby effectively reducing the reflectivity of ambient light on the first metal layer 2013, and improving the display effect. Specifically, it is indicated by some test results that, the reflectivity without the first anti-reflection layer 2012 is 9.2, and the reflectivity with the first anti-reflection layer 2012 is 6.78, so the reflectivity is reduced by 26%.

The orthographic projection of the first anti-reflection layer 2012 on the first base substrate 2011 is completely coincident with the orthographic projection of the first metal layer 2013 on the first base substrate 2011. Alternatively, the orthographic projection of the first metal layer 2013 on the first base substrate 2011 is located within the orthographic projection of the first anti-reflection layer 2021 on the first base substrate 2011, so as to obtain a better reflection reduction effect.

In some embodiments, the first anti-reflection layer 2012 may be formed of molybdenum (Mo) metal oxide or the like, for example, by depositing Mo metal oxide under the first metal layer 2013, and the pattern shape of the Mo metal oxide is the same as that of the first metal layer 2013, thereby effectively reducing the reflectivity of the surface of the first metal layer 2013. In other embodiments, a composite insulating layer may also be used to achieve anti-reflection of ambient light. The composite insulating layer may include a monocrystalline Si layer and a Si composition layer (for example, $SiO_2$, $Si_3N_4$) alternately stacked, wherein the refractive index of the monocrystalline Si layer is lower than that of the Si composition layer. For example, a double-layer composite structure including a Si composition layer of a higher refractive index and a monocrystalline Si layer of a lower refractive index is provided, wherein the Si composition layer is located on one side adjacent to ambient light.

Referring to FIGS. 3, 7-9, in some embodiments, the display panel has a display area AA and a non-display area W surrounding the display area AA. According to a direction relative to the display area AA, the non-display area W may be divided into a lower border area W1, an upper border area W2, a left border area W3, and a right border area W4. The array substrate 201 may further include a plurality of first thin film transistors located in the display area AA.

In FIGS. 8 and 9, the array substrate 201 may further include: a first insulating layer 2014, a planarization layer 2015, a common electrode 2016, a second insulating layer 2017 and a pixel electrode 2018. The first insulating layer 2014 is arranged on one side of the first base substrate 2011 adjacent to the color film substrate 202 and covers the gate metal layer of the first thin film transistor. The planarized layer 2015 is arranged on one side of the first insulating layer 2014 adjacent to the color film substrate 202. The common electrode 2016 is arranged on one side of the planarization layer 2015 adjacent to the color film substrate 202. The second insulating layer 2017 is arranged on one side of the common electrode 2016 adjacent to the color film substrate 202. The pixel electrode 2018 is arranged on one side of the second insulating layer 2017 adjacent to the color film substrate 202.

The color film substrate 202 may include: a second base substrate 2021, a color resist layer 2022 and a black matrix 2023. The second base substrate 2021 may be formed of a transparent material such as glass. In some embodiments, the common electrode 2016 may also be arranged on the color film substrate 202, for example, on one side of the color resist layer 2022 adjacent to the liquid crystal layer 208. The color resist layer 2022 may include, but not limited to, a red color resist R, a green color resist G, and a blue color resist B. Each color resist is defined by the black matrix 2023.

In the above-described embodiments, the first metal layer 2013 may include the gate metal layers of the plurality of first thin film transistors. Correspondingly, the first anti-reflection layer 2012 may use a mask (Gate Mask) for forming the gate metal layers to form the first anti-reflection layer 2012 and the gate metal layer by single patterning. In other embodiments, the first metal layer 2013 may include the source and drain metal layers of the plurality of first thin film transistors. Correspondingly, the first anti-reflection layer 2012 may use a mask (SD Mask) for forming the source and drain metal layers to form the first anti-reflection layer 2012 and a source and drain metal layers by single patterning.

In other embodiments, the first metal layer 2013 may include gate metal layers and source and drain metal layers of a plurality of first thin film transistors. Correspondingly, the first anti-reflection layer 2012 may further include two types of first anti-reflection layers, and use the mask for forming the gate metal layer to form the first anti-reflection layer of a first type and the gate metal layer by single patterning, and use the mask for forming the source and drain metal layers to form the first anti-reflection layer of a second type and the source and drain metal layer by single patterning. Alternatively, the first anti-reflection layer 2012 is a single film layer, which is first formed by one patterning process, and then the gate metal layer and the source and drain metal layers are respectively formed by two additional masking processes, so that the pattern of the first anti-reflection layer 2012 is the same as the patterns of the gate metal layer and the source and drain metal layers (or their orthographic projections on the first base substrate are completely coincident).

Referring to FIGS. 7 and 9, the array substrate 201 may include a gate driving circuit 210 (Gate Driver on Array, simply referred to as GOA) located in the non-display area W, and may also include a driving chip (Driver IC) such as a source driving circuit 206. Since the gate driving circuit 210 and the traces are denser than the metal wires in the display area AA, and the array substrate 201 is flipped upside, the visual difference between the non-display area W and the display area AA is relatively obvious.

In order to improve this problem, referring to FIGS. 4, 5, 7 and 8, in some embodiments, the display module further includes a first light shielding layer 207. The first light shielding layer 207 is located on one side of the array substrate 201 away from the backlight module 01. The orthographic projection of the first light shielding layer 207 on the array substrate 201 is located in the non-display area W, and at least partially covers the gate driving circuit 210. By way of the light shielding effect of the first light shielding layer 207 on the metal wires of the gate driving circuit 210 or the like in the non-display area W, the chromatic difference between the non-display area W and the display area AA is reduced due to different densities of the metal wires. Moreover, the first light shielding layer 207 can also shield the backlight light in the non-display area W, and prevent light leakage in the non-display area W.

According to different manufacturing processes, the first light shielding layer 207 may include: an ink printing layer located between the first polarizer 203 and the array substrate 201, and the ink printing layer is in contact with the first polarizer 203 or the array substrate 201; or an ink printing layer located on one side of the first polarizer 203 away from the array substrate 201. Alternatively, the ink print layer may be formed of black ink.

FIGS. 10 (A)-(F) are schematic views of multiple methods for attaching a first polarizer on an array substrate and forming a first light shielding layer during the preparation process in some embodiments of the display device of the present disclosure.

In FIGS. 10 (A) and (B), the first light shielding layer 207 formed by ink printing is located between the first polarizer 203 and the array substrate 201. The first polarizer 203 may include a triacetate cellulose TAC layer, a polyvinyl alcohol PVA layer and a TAC layer sequentially stacked. For the first polarizer 203 that may be obtained or purchased, a protective film and a release film may also be attached to the upper and lower surfaces of the first polarizer 203, and the protective film and the release film may be removed during subsequent processing.

Referring to FIG. 10 (A), in order to form the first light shielding layer 207, the array substrate 201 is first provided, and then ink 2071 is printed on the surface of a back side of the array substrate 201 (i.e., one side of the first base substrate 2011 away from the color film substrate 202), so as to form the ink printing layer as the first light shielding layer 207, and then the first polarizer 203 is attached to one side of the array substrate 201 where ink 2071 is printed through the adhesive layer 211 (for example, the pressure sensitive adhesive PSA). The display panel manufacturers may print ink on the first base substrate made of glass in the array substrate after manufacturing or obtaining the array substrate, so as to obtain an ink printing layer with higher printing accuracy, and reduce or avoid the problems of light reflection of the exposed metal wires in the non-display area of the array substrate or light leakage of the backlight.

Referring to FIG. 10 (B), in order to form the first light shielding layer 207, a first polarizer 203 is first provided, and then ink 2071 is printed on the surface of the first polarizer 203, so as to form an ink printing layer as the first light shielding layer 207. Further, an adhesive layer 211 (for example, Pressure Sensitive Adhesive, simply referred to as PSA) is arranged on the surface of the first polarizer 203 where ink 2071 is printed, and then the surface of one side of the array substrate 201 away from the color film substrate is attached to the ink-printed side of the first polarizer 203 through the adhesive layer 211. The polarizer manufacturer may entrust the ink printing factory to print ink on the first polarizer, and then compound the adhesive layer and the release film on the ink-printed first polarizer, so as to form the first polarizer product with the ink printing layer. The display panel manufacturer may adhere the purchased first polarizer product to the array substrate. This method eliminates the need for the display panel manufacturer to purchase an expensive ink printing device, which may effectively reduce the production cost.

In FIGS. 10 (C)-(F), the first light shielding layer 207 formed by ink printing is located on one side of the first polarizer 203 away from the array substrate 201. The first polarizer 203 may include a TAC layer, a PVA layer and a TAC layer sequentially stacked. For the first polarizer 207 that may be obtained or purchased, a protective film and a release film may also be attached to the upper and lower surfaces of the first polarizer 207, and the protective film and the release film may be removed during subsequent processing. In addition, since the ink printing layer is located on one side of the first polarizer adjacent to the environment, in order to improve the durability of the screen, a functional film layer 212 with a specific protective function may be provided on one side of the first light shielding layer 207 away from the array substrate 201, for example at least one of a surface hard coating HC (Hard Coating), an anti-reflection layer AR (Anti-Reflection), an anti-glare layer AG (Anti-Glare), anti-fingerprint layer AF (Anti-Fingerprint) and an anti-microbe layer AM (Anti-Microbe).

Referring to FIG. 10 (C), in order to form the first light shielding layer 207, the first polarizer 203 is first provided, and then the first polarizer 203 is attached to the surface of a back side of the array substrate 201 (i.e., one side of the first base substrate 2011 away from the color film substrate 202), and then ink 2071 is printed on the surface of one side of the first polarizer 203 away from the array substrate, so as to form the ink printing layer as the first light shielding layer 207, and then a functional film layer 212 is provided on one side of the polarizer 203 where ink 2071 is printed. The display panel manufacturer may obtain the first polarizer from the polarizer manufacturer, and attach the first polarizer to the manufactured array substrate. Further, ink is printed on the first polarizer, and the functional film layer 212 is provided. The manufacturing process of this method is simple, which has a minor influence on the existing manufacturing process of the display panel.

Referring to FIG. 10 (D), in order to form the first light shielding layer 207, a first polarizer 203 is first provided, and then ink 2071 is printed on the surface of the first polarizer 203, so as to form an ink printing layer as the first light shielding layer 207. Further, a functional film layer 212 is arranged on the surface of the first polarizer 203 where ink 2071 is printed, and then the surface of one side of the first polarizer 203 away from the functional film layer 212 is attached to the surface of one side of the array substrate 201 away from the color film substrate 202. The polarizer manufacturer may entrust the ink printing factory to (or voluntarily) print ink on the first polarizer, and then compound the functional film layer on the ink-printed first polarizer as necessary, so as to form the first polarizer product with the ink printing layer. The display panel manufacturer may adhere the purchased first polarizer product to the array substrate. This method eliminates the need for the display panel manufacturer to purchase an expensive ink printing device, which may effectively reduce the production cost.

Referring to FIG. 10 (E), in order to form the first light shielding layer 207, a first polarizer 203 is first provided, and then a substrate 213 (for example, polyethylene terephthalate PET or TAC) where ink 2071 is printed is attached to the surface of the first polarizer 203). In other words, a substrate 213 including an ink printing layer as the first light shielding layer 207 is attached to the surface of the first polarizer 203. Then, the surface of one side of the first polarizer 203 away from the ink printing layer is attached to the surface of one side of the array substrate 201 away from the color film substrate 202. The polarizer manufacturer may directly purchase the ink-printed substrate, and attach the substrate to the first polarizer, so as to form the first polarizer product with the ink printing layer. The display panel manufacturer may adhere the purchased first polarizer product to the array substrate. This method eliminates the need for the polarizer manufacturer and the display panel manufacturer to purchase an expensive ink printing device, which may effectively reduce the production cost.

Referring to FIG. 10 (F), in order to form the first light shielding layer 207, a first polarizer 203 is first provided, and then the first polarizer 203 is attached to the surface of a back side of the array substrate 201 (i.e., one side of the first base substrate 2011 away from the color film substrate 202). Further, the substrate 213 (for example, polyethylene terephthalate PET or TAC) where ink 2071 is printed, that is, the substrate 213 including as the base material of the ink printing layer as the first light shielding layer 207 is attached to the surface of the first polarizer 203. The display panel manufacturer may purchase the first polarizer from the polarizer manufacturer, and additionally purchase the substrate including ink, so as to realize the attachment of the first polarizer, the substrate and the array substrate. In this way, there is no need for the display panel manufacturer to purchase an expensive ink printing device, which may effectively reduce the production cost. Moreover, there is no need to customize a specific first polarizer product from the polarizer manufacturer, which is also conducive to reducing the cost.

In addition to the use of a method of printing ink, other methods may also be used for light shielding of the non-display area. Referring to FIG. 9, in some embodiments, the array substrate further includes: a second anti-reflection layer 2071 and a second metal layer 2072, wherein the second anti-reflection layer 2071 is located on the first base substrate 2011, and the second metal layer 2072 is located on one side of the second anti-reflection layer 2071 away from the first base substrate 2011. The second anti-reflection layer 2071, the second metal layer 2072 and the gate driving circuit 210 are all located in the non-display area W, wherein a portion where the orthographic projections of the second anti-reflection layer 2071 and the second metal layer 2072 on the base substrate 2011 are coincident with each other at least partially cover the orthographic projection of the gate driving circuit 210 on the first base substrate 2011. The second anti-reflection layer 2071 and the second metal layer 2072 thus stacked constitute a light shielding layer structure 207' that shields the gate driving circuit in the non-display area, which is equivalent to a light shielding layer integrated within the array substrate.

Referring to FIG. 9, in order to form the above-described light shielding layer structure 207', one layer of metal oxide (for example, molybdenum metal oxide) may be deposited on the surface of the first base substrate 2011, and then one layer of metal (for example, aluminum or the like) may be deposited on the layer of metal oxide. Further, a second anti-reflection layer 2071 and a second metal layer 2071 that are patterned are formed by single mask exposure, development and etching. The second anti-reflection layer 2071 may be prepared by the same patterning process as the first anti-reflection layer 2012 in the foregoing embodiments, so as to save the process. The first insulating layer 2014 may be formed on one side of the first base substrate 2011 adjacent to the color film substrate 202 and cover the gate metal layer of the first thin film transistor and the second metal layer 2072.

FIGS. 11 and 12 are partially schematic structural views of a display area and a periphery on the array substrate in some embodiments of the display device of the present disclosure respectively.

In order to avoid the light reflection problem caused by the incomplete coverage of the ink printing layer due to inaccurate printing, for example, if the position external to the edge of the display area is not completely covered, it is possible to cause light reflection of the dense metal wires that are not covered, which visually produces the unfavorable effect of a bright line in the border. In order to overcome this problem, referring to FIGS. 11 and 12, a whole column of dummy pixels may be added at a periphery of the display area. These dummy pixels are located in the position of the non-display area adjacent to the display area. Even if the ink printing layer does not cover this portion, since these dummy pixels do not have dense metal wires, it may not cause an apparent visual impact due to light reflection. Specifically, in some embodiments, the array substrate 201 further includes: a plurality of first thin film transistors 2019 and a plurality of second thin film transistors 2019'. The plurality of first thin film transistors 2019 are located in the display area AA. The plurality of second thin film transistors 2019' are located in the non-display area W (framed by dotted lines in FIGS. 11 and 12), and adjacent to one row or column of first thin film transistors 2019 among the plurality of first thin film transistors 2019 located at an edge of the display area.

In FIG. 11, the first thin film transistor 2019 and the second thin film transistor 2019' both include a gate 2019a, an active layer 2019b and a source 2019c. The difference between them is that the first thin film transistor 2019 located in the display area AA further includes a drain 2019d electrically connected to the pixel electrode 2018, while the second thin film transistor 2019 located in the non-display area W does not include a drain. In FIG. 12, the first thin film transistor 2019 and the second thin film transistor 2019' both include a gate 2019a, a source 2019c and a drain 2019d. The difference between them is that the first thin film transistor 2019 located in the display area AA further includes the active layer 2019b electrically connected to the drain 2019d and the gate 2019a, while the second thin film transistor 2019' located in the non-display area W does not include the active layer 2019b.

FIG. 13 is a partially schematic structural view of the display device shown in FIG. 2. FIG. 14 is a partially schematic structural view in an embodiment of the display device of the present disclosure.

Referring to FIGS. 4, 5, 8, 9 and 14, in some embodiments, the array substrate 201 includes: a first portion P1 and a second portion P2. The orthographic projection of the first portion P1 on the rear portion 31 is completely coincident with the orthographic projection of the color film substrate 202 on the rear portion 31, and the orthographic projection of the second portion P2 on the rear portion 31 and the orthographic projection of the second portion P2 on the rear portion 31 do not overlap with each other. In other words, the first portion of the array substrate 201 is a portion directly facing towards the color film substrate 202 and having the same shape and area, while the second portion is a portion other than the first portion of the array substrate 201.

The orthographic projection of the backlight module 01 on the rear portion 31 may be completely coincident with the orthographic projection of the array substrate 201 on the rear portion 31 (for example, as shown in FIGS. 8 and 9). Referring to FIGS. 4 and 5, the orthographic projection of the backlight module 01 on the rear portion 31 may be located within the orthographic projection of the array substrate 201 on the rear portion 31, so as to avoid other elements within the housing 03, for example a sensor such as a photosensitive unit.

The display module 02 further includes: a flexible circuit board 05 located on one side of the second portion P2 of the array substrate 201 adjacent to the color film substrate 202, and a driving circuit board 06 electrically connected to the flexible circuit board 05. Referring to FIGS. 8, 9 and 14, the second portion P2, the backlight module 01, the color film substrate 202 and the side portion 32 enclose an accommodating space. In this way, at least part of the flexible circuit board 05 and the driving circuit board 06 may be bent and arranged in the accommodating space.

Referring to FIG. 4, in some embodiments, the display device further includes a hollow rotary shaft 07 arranged on the housing 03, and the hollow rotary shaft 07 may be located in an edge position of one side of the housing 03. An antenna 71 may be provided within the hollow shaft 07. If there is a spare space within the hollow shaft 07, at least part of the flexible circuit board 05 and the driving circuit board 06 may also be bent and arranged in the space.

In the embodiments of the present disclosure, the driving circuit board 06 and at least part of the flexible circuit board 05 are arranged in the accommodating space or the hollow shaft 07, so that the display module 02 may directly overlap the housing 03, thereby omitting a overlap distance $W_1'$ between the protective cover plate 04 and the housing 03 (referring to FIG. 13). The lower frame DB of a whole machine is completely formed by the lower frame $W_1$ of the display module 02 (referring to FIG. 14). Compared with the structure of the related art shown in FIG. 2, in the embodiments of the present disclosure, it is possible to effectively reduce the size of the frame, and further enhance the screen-to-body ratio of the display device, which is conducive to realizing a full-screen structure.

Referring to FIGS. 3-4, in some embodiments, the display device further includes: a photosensitive unit 08, for example a front-facing camera. The photosensitive unit 08 is arranged within the housing 03 and located on one side of the color film substrate 202 away from the array substrate 201, and the photosensitive unit 08 is located in the non-display area W. The photosensitive unit 08 is integrated with the display module 02, and the photosensitive unit 08 is located on a lower side of the display module 02, so that it is possible to obtain a front integrated effect, and reduce the problems in other methods, for example a yield loss in the process in a method of adding decorative strips to provide a photosensitive unit, as well as inconvenient handling and charging and ID design conflicts during use in an external camera method.

FIGS. 15 and 16 are schematic views of the arrangement of a second light shielding layer and a first frame sealant of the display module in some embodiments of the display device of the present disclosure respectively. FIG. 17 is a schematic cross-sectional view of still another embodiment of the display device of the present disclosure. FIGS. 18 and 19 are schematic views of the arrangement of a second light shielding layer, the first frame sealant and a second frame sealant of the display module in some embodiments of the display device of the present disclosure respectively. FIGS. 20-22 are schematic views of the relative positions of a photosensitive unit and the second light shielding layer in some embodiments of the display device of the present disclosure respectively.

Referring to FIG. 4 and FIGS. 15-19, in some embodiments, the display module 02 further includes: a second light shielding layer 209. The second light shielding layer 209 is located on one side of the photosensitive unit 08 adjacent to the color film substrate, and has a first hollowed-out area 2091. The orthographic projection of the light incident area 81 of the photosensitive unit 08 on the array substrate 201 is at least partially coincident with the orthographic projection of the first hollowed-out area 2091 of the second light shielding layer 209 on the array substrate 201. The photosensitive unit 08 is capable of capturing images outside the display module 02 through the light incident area 81. Referring to the inverted triangular portion of the photosensitive unit 08 shown in FIGS. 20 to 22, this portion represents an element of the photosensitive unit 08 to realize a photosensitive effect, and the range of the light incident area 81 of the photosensitive unit 08 corresponds to the bottom surface portion of the inverted triangle.

The first hollowed-out area 2091 may ensure the light collection of the light incident area 81 of the photosensitive unit 08. The ambient light except for from the first hollowed-out area 2091 is shielded by the second light shielding layer 209, so as to implement controlling a light receiving range of the photosensitive unit 08. In some embodiments, the second light shielding layer 209 and the first light shielding layer 207 may be formed by a single patterning process so as to save the steps.

In FIGS. 15, 16, 18 and 19, the first hollowed-out area 2091 may be arranged in the middle of the upper frame area $W_2$ of the display module 02. The upper frame area $W_2$ may be provided in an outward local projection shape relative to the display area, so as to reduce the size of the borders on both sides of the photosensitive unit 08 and achieve the effect of a narrow frame. The local projection may be embedded in the housing 03, with a chamfer provided at an embedded location of the housing 03, so as to be more coordinated on an entirety of the display device. In other embodiments, the first hollowed-out area 2091 may be arranged in the non-display area in other directions, for example the lower frame area $W_1$, the left frame area $W_3$, and the right frame area $W_4$, and may be arranged at a position of the non-display area proximate to an edge.

In FIG. 4, the display module 02 further includes: a liquid crystal layer 208 and a first frame sealant 205. The liquid crystal layer 208 is located between the array substrate 201 and the color film substrate 202. The first frame sealant 205 is located between the color film substrate 202 and the array substrate 201, and encloses the liquid crystal layer 208. Referring to FIGS. 20-22, the orthographic projection of the light incident area 81 of the photosensitive unit 08 on the array substrate 201 or the orthographic projection of the first hollowed-out area 2091 of the second light shielding layer 209 on the array substrate 201 is located within the orthographic projection of the liquid crystal layer 208 on the array substrate 201. In this way, external light enters the photosensitive unit 08 through the liquid crystal layer 208.

Referring to FIGS. 17-19, in some embodiments, the display module 02 further includes: a liquid crystal layer 208, a first frame sealant 205 and a second frame sealant 205'. The liquid crystal layer 208 is located between the array substrate 201 and the color film substrate 202. The first frame sealant 205 is located between the color film substrate 202 and the array substrate 201, and encloses the liquid crystal layer 208. The second frame sealant 205' is located between the color film substrate 202 and the array substrate 201, and encloses a vacuum area 2081 together with the first frame sealant frame. The orthographic projection of the light incident area 81 of the photosensitive unit 08 on the array substrate 201 or the orthographic projection of the first hollowed-out area 2091 of the second light shielding layer 209 on the array substrate 201 is located within the orthographic projection of the vacuum area 2081 on the array substrate 201. In this way, external light enters the photosensitive unit 08 through the vacuum area 2081.

Compared with the structure that enters the photosensitive unit 08 through the liquid crystal 208 in FIG. 4, there is no need for external light in FIG. 17 to pass through the liquid crystal, thereby avoiding the refraction and scattering of the light by the liquid crystal, and also avoiding to affect the image forming effect of the photosensitive unit due to contamination of the liquid crystal. Compared with the structure shown in FIG. 17, the structure shown in FIG. 4 may reduce the coating amount of the sealant. In order to reduce the size of the non-display area corresponding to the photosensitive element 08, when the display panel is cut out from the mother board, it is possible to perform cutting along the frame sealant, that is, the frame sealant is cut, so that the width of the frame sealant itself is further reduced, for example, reduced by 0.4~0.7 mm.

For example, the thicknesses of the array substrate 201 and the color film substrate 202 may be set to be 0.2~0.5 mm, the thicknesses of the first polarizer 203 and the second polarizer 204 may be set to be 0.08~0.15 mm, the thickness of the cell may be set to be 2.5~3.5 μm, and the thickness of the second light shielding layer 209 may be set to be 3-5 μm. The size of the first hollowed-out area 2091 may be adjusted according to a viewing angle 82 of the light incident area 81 of the photosensitive unit 08 on an outer side of the display module (i.e., one side away from the backlight module), for example, the bore diameter of the first hollowed-out area 2091 is set to be 2-3 mm, and the bore diameter of the light incident area 81 of the photosensitive unit 08 may be set to be 2.0-2.5 mm.

When ambient light passes through the first polarizer and the array substrate in the air, refraction will occur once. According to the law of refraction n1*Sin a=n2*Sin b, where the air refractive index n1=1.0, the refractive index realized by the array substrate and the first polarizer or the like with the base substrate formed of a glass material is substantially the glass refractive index n2, n2=1.5, and a and b are the incident angle and the refraction angle respectively. After light passes through glass, the angle of refraction becomes smaller. The light travels along a straight line in the glass, and will be refracted again at an interface between the air and the color film substrate and the second polarizer with the base substrate formed of a glass material. Finally, the light enters the photosensitive unit 08, thereby realizing the light collection. Under normal circumstances, the viewing angle 82 of the light incident area 81 of the photosensitive unit 08 on an outer side of the display module is generally 70-90° to meet the requirements. In order to meet the requirements of a viewing angle, it is possible to implement adjusting the viewing angle by adjusting the size of the first hollowed-out area 2091.

Referring to FIG. 20, in some embodiments, the second light shielding layer 209 includes: an ink light shielding layer located on one side of the array substrate 201 away from the color film substrate 202. For example, in FIG. 20, the second light shielding layer 209 may be arranged between the first polarizer 203 and the array substrate 201. In other embodiments, the second light shielding layer 209 may also be arranged within the first polarizer 203 or on one side of the first polarizer 203 away from the base substrate 201. Referring to the foregoing embodiments of FIGS. 10 (A)-(F) where the first light shielding layer 207 is provided, the second light shielding layer 209 may be formed together with the first light shielding layer 207, for example, forming the second light shielding layer 209 and the first light shielding layer 207 by a single process in a method of printing ink on the array substrate 201 or the first polarizer 203, thereby reducing the steps.

Referring to FIG. 21, in some embodiments, the second light shielding layer 209 includes: an ink light shielding layer located on the surface of one side of the color film substrate 202 adjacent to the photosensitive unit 08. Compared with the structure shown in FIG. 20, this structure realizes the first hollowed-out area 2091 of a smaller size under the condition of realizing the same viewing angle.

Referring to FIG. 22, in some embodiments, the second light shielding layer 209 includes: a black matrix located within the color film substrate 202. In this way, the black matrix in the color film substrate is more adequately utilized to realize the viewing angle 82 of the light incident area 81 of the photosensitive unit 08. Compared with the structures shown in FIGS. 20 and 21, the ink printing process may be omitted, thereby realizing a reduced cost and a simplified process. Generally speaking, the thickness of the black matrix may be set to be 1-2 μm, so that it has a higher light shielding effect and a smaller level difference relative to the base substrate than the ink light shielding layer with a thickness of 3~5 μm, thereby avoiding the unfavorable problems in the ink light shielding layer, for example it is likely to produce air bubbles in order to grind a level difference.

FIG. 23 is a schematic view of the arrangement of the second light shielding layer and a second hollowed-out area of the display module in an embodiment of the display device of the present disclosure. FIG. 24 is a schematic view of the relative positions of a light incident area, a first hollowed-out area and the second hollowed-out area in an embodiment of the display device of the present disclosure.

Considering that the first polarizer is provided on one side of the photosensitive unit adjacent to the color film substrate, there is a certain loss when external light passes through the first polarizer, which affects the image forming effect. To further overcome this problem, referring to FIGS. 23 and 24, in some embodiments, the first polarizer 203 has a second hollowed-out area 2031. The orthographic projection of the light incident area 81 of the photosensitive unit 08 on the array substrate 201 or the orthographic projection of the first hollowed-out area 2091 of the second light shielding layer 209 on the array substrate 201 is located within the orthographic projection of the second hollowed-out area 2031 of the first polarizer 203 on the he array substrate 201. The polarizer material corresponding to the second hollowed-out area 2031 may be removed by cutting the polarizer into a special shape in the second hollowed-out area 2031.

FIG. 25 is a schematic view of the relative positions of the light incident area, the first hollowed-out area and the depolarization area in an embodiment of the display device of the present disclosure.

In order to improve the integration effect of the first polarizer with respect to the array substrate, referring to FIG. 25, in some embodiments, the first polarizer 203 has a depolarization area 2032. The orthographic projection of the light incident area 81 of the photosensitive unit 08 on the array substrate 201 or the orthographic projection of the first hollowed-out area 2091 of the second light shielding layer 209 on the array substrate 201 is located within the second hollowed-out area 2031 of the first polarizer 203 or the depolarization areas 2032 on the array substrate 201. In order to form the depolarization area 2032, when the first polarizer 203 is manufactured, a protective film with a hollowed-out area is attached on the PVA layer, and then the PVA layer is locally subjected to depolarization, that is, the polarizer material corresponding to the hollowed area of the protective film is removed. Further, the protective film on the PVA layer is removed, and then other film layers, such as a PSA layer, a TAC layer and a protective film layer, are provided on the PVA layer.

FIG. 26 is a schematic flowchart in an embodiment of a manufacturing method of a display device of the present disclosure.

Based on the above-described embodiments of the display device, referring to FIG. 26, in some embodiments, the manufacturing method of the display device described above includes the following steps S100 to S400:

Step S100: providing a display panel having a display area and a non-display area surrounding the display area, wherein the display panel includes an array substrate and a color film substrate arranged opposite to each other, and the array substrate includes a gate driving circuit located in the non-display area.

In order to obtain the above-described display panel, a plurality of display panels may be formed in the mother board. The display panel includes an array substrate 201 and a color film substrate 202 arranged opposite to each other, a liquid crystal layer 208 located between the array substrate 201 and the color film substrate 202, and a first frame sealant 205 sealing the array substrate 201 and the color film substrate 202.

In a specific implementation, the process of forming the array substrate 201 includes:

providing a first base substrate 2011;

forming a first anti-reflection layer 2012 on the first base substrate 2011; and forming a first metal layer 2013 on one side of the first anti-reflection layer 2012 away from the first base substrate 2011, wherein the orthographic projection of the first metal layer 2013 on the first base substrate 2011 is completely coincident with the orthographic projection of the first anti-reflection layer 2012 on the first base substrate 2011, or located within the orthographic projection of the first anti-reflection layer 2012 on the first base substrate 2011. The process of forming the first anti-reflection layer 2012 and the first metal layer 2013 may be implemented in the following two methods.

The first implementation method consists in: sequentially forming an anti-reflection film and a metal film on the first base substrate 2011; and performing a single mask process on the metal film and the anti-reflection film to form the first anti-reflection layer 2012 and the first metal layer 2013 with patterns conforming to each other. Specifically, the first metal layer 2013 is a gate metal layer or a source and drain metal layer.

The second possible implementation consists in: forming an anti-reflection film on the first base substrate 2011, and performing a single mask process on the anti-reflection film to form a first anti-reflection layer 2012 with a pattern conforming to the gate metal layer and the source and drain metal layers subsequently; and sequentially performing two mask processes on the first anti-reflection layer 2012 to form a gate metal layer and a source and drain metal layer respectively.

The methods for forming the active layer, the first insulating layer 2014, the planarized layer 2015, the common electrode 2016, the second insulating layer 2017 and the pixel electrode 2018 contained in the array substrate 201, as well as for forming the color resist layer 2022 and the black matrix 2023 contained in the color film substrate 202 are the same as that in the prior art, and thus will not be described in detail here.

After a plurality of display panels are formed in the mother board, a plurality of independent monolithic display panels may be cut from the mother board in a cutting method by a cutter wheel. In order to match the overall shape of some display devices (for example, notebook computers), a monolithic display panel may be cut into a special shape, and it is possible to realize rounded cutting of the display panel in a grinding and laser cutting method.

Step S200: attaching a first polarizer to the array substrate, and forming a first light shielding layer on one side of the array substrate away from the color film substrate, wherein the orthogonal projection of the first light shielding layer on the array substrate is located in the non-display area and at least partially covers the gate driving circuit. The first light shielding layer may be formed by a screen transfer or inkjet method, which can eliminate the light reflection problem of GOA and metal traces in the non-display area of the array substrate. For the steps of attaching a first polarizer to the array substrate, and forming a first light shielding layer on one side of the array substrate away from the color film substrate, please refer to the foregoing illustrations of FIGS. 10 (A)-(F), and description will not be made in detail here.

In addition to attaching the first polarizer, the method further includes attaching a second polarizer on the color film substrate. The size of the second polarizer 204 on the color film substrate 202 may be smaller than that of the display panel, and the size of the first polarizer 203 on the array substrate 201 may be larger than that of the array substrate 201. The first polarizer 203 beyond the array substrate 201 is cut by scanning a peripheral trajectory of the array substrate 201 with a carbon dioxide laser, which may ensure that the first polarizer 203 is completely aligned with the array substrate 201.

Step S300: binding the driving chip 206 on the array substrate to which the first polarizer has been attached, and binding one end of the flexible circuit board 05 to the array substrate 201 and connecting another end of the flexible circuit board 05 to the driving circuit board 06, so as to form the display module 02.

Step S400: providing a housing 03 and a backlight module 01, sequentially mounting the backlight module 01 and the display module 02 within the housing 01, and positioning the color film substrate 202 between the array substrate 201 and the backlight module 01. The portions of the backlight module 01 and the display module 02 which are in contact with the housing 03 may be adhered by a tape or spot gluing, so as to produce a fixing effect. The driving circuit board 06 may be fixed in the hollow shaft 07 or bent and fixed within the accommodating space enclosed by the array substrate 201, the backlight module 01, the color film substrate 202 and the side portion by a tape, a screws or the like. So far, the assembling of the display device of a whole machine is completed.

It should be noted that, in the above-described manufacturing method provided by the embodiments of the present invention, the patterning process involved in forming various layers of structures may not only include part of or all the processes such as deposition, photoresist coating, mask masking, exposure, development, etching and photoresist stripping, and may also include other technological processes, which are specifically subject to forming a graph with a desired patterning in an actual forming process, and thus will not be defined here. For example, there may further include a post-bake step after development and before etching.

Among them, the deposition process may be chemical vapor deposition, plasma enhanced chemical vapor deposition or physical vapor deposition, which will not be defined here. The mask used in the mask process may be a half tone mask, a single slit diffraction mask (Single Slit Mask) or a gray tone mask, which will not be defined here. The etching may be dry etching or wet etching, which will not be defined here.

In some embodiments, the manufacturing method of a display device may further include: arranging a photosensitive unit within the housing, and positioning the photosensitive unit on one side of the color film substrate away from the array substrate. Among them, the step of forming the display module may further include: forming a second light shielding layer on one side of the photosensitive unit adjacent to the color film substrate, wherein the second light shielding layer has a first hollowed-out area, and the orthographic projection of the light incident area of the photosensitive unit on the array substrate is at least partially coincident with the orthographic projection of the first hollowed-out area of the second light shielding layer on the array substrate.

On the basis of the above-described embodiments, the step of forming the array substrate may further include: forming a second anti-reflection layer on the first base substrate; forming a second metal layer on one side of the second anti-reflection layer away from the first base substrate; and forming a gate driving circuit on one side of the second metal layer away from the first base substrate, wherein the second anti-reflection layer, the second metal layer and the gate driving circuit are all located in the non-display area, and a portion where the orthographic projections of the second anti-reflection layer and the second metal layer on the first base substrate are coincident with each other at least partially covers the orthographic projection of the gate driving circuit on the first base substrate.

In order to reduce the steps, in some embodiments, the first anti-reflection layer and the second anti-reflection layer may be prepared by the same patterning process.

In the above-described embodiments of the display device, the array substrate is flipped upside for use, and the first polarizer mounted on the array substrate is multiplexed as a protective cover plate, which avoids individual provision of the protective cover plate and saves the attachment step of the protective cover plate, thereby realizing a light and thin display device, simplifying the manufacturing process, and improving the product yield.

A plurality of embodiments in the present description are described in a progressive manner with different focuses respectively. Cross-reference may be made for the same or similar parts between the respective embodiments. For the embodiments of the manufacturing method of a display device, since the method as a whole and the steps involved therein are in a relationship corresponding to the content in the embodiments of the display device, such embodiments are described in a relatively simple manner. For the relevant aspects, reference may be made to some of the descriptions of the embodiments of the device.

Hereto, various embodiments of the present disclosure have been described in detail. Some details well known in the art are not described in order to avoid obscuring the concept of the present disclosure. According to the above description, those skilled in the art would fully understand how to implement the technical solutions disclosed here.

Although some specific embodiments of the present disclosure have been described in detail by way of examples, those skilled in the art should understand that the above examples are only for the purpose of illustration but not for limiting the scope of the present disclosure. It should be understood by those skilled in the art that modifications to the above embodiments and equivalently substitution of part of the technical features may be made without departing from the scope and spirit of the present disclosure. The scope of the present disclosure is defined by the appended claims.

What is claimed is:

1. A display device, comprising:
a backlight module;

a display module located on a light exiting side of the backlight module; and a housing accommodating the backlight module and the display module, wherein the display module comprises:
 a display panel comprising an array substrate and a color film substrate arranged opposite to each other, wherein the color film substrate is located between the array substrate and the backlight module; and
 a first polarizer located on one side of the array substrate away from the color film substrate;

wherein the display panel has a display area and a non-display area surrounding the display area, and the display device further comprises: a photosensitive unit provided within the housing and located on one side of the color film substrate away from the array substrate, wherein the photosensitive unit is located in the non-display area;

wherein the display module further comprises: a second light shielding layer located on one side of the photosensitive unit adjacent to the color film substrate, and having a first hollowed-out area, wherein an orthographic projection of the light incident area of the photosensitive unit on the array substrate is at least partially coincident with an orthographic projection of the first hollowed-out area of the second light shielding layer on the array substrate;

wherein the array substrate comprises a gate driving circuit located in the non-display area, and the display module also comprises: a first light shielding layer located on one side of the array substrate away from the backlight module, wherein an orthographic projection of the first light shielding layer on the array substrate is located in the non-display area, and at least partially covers the gate driving circuit; and wherein the array substrate further comprises;
 a plurality of first thin film transistors located in the non-display area; and
 a plurality of second thin film transistors located in the non-display area and adjacent to one row or one column of first thin film transistors among the plurality of first thin film transistors which are located at an edge of the display area,
 wherein at least one of the plurality of second thing film transistors does not comprise a drain metal layer or an active layer.

2. The display device according to claim 1, wherein the second light shielding layer comprises:
 an ink light shielding layer on one side of the array substrate away from the color film substrate; or
 an ink light shielding layer on the surface of one side of the color film substrate adjacent to the photosensitive unit; or
 a black matrix located within the color film substrate.

3. The display device according to claim 1, wherein the first polarizer has a second hollowed-out area or a depolarization area, and the orthographic projection of the light incident area of the photosensitive unit on the array substrate or the orthographic projection of the first hollowed-out area of the second light shielding layer on the array substrate is located within an orthographic projection of the second hollowed-out area or the depolarization area of the first polarizer on the array substrate.

4. The display device according to claim 1, wherein the display panel further comprises:
 a liquid crystal layer located between the array substrate and the color film substrate; and
 a first frame sealant located between the color film substrate and the array substrate and enclosing the liquid crystal layer.

5. The display device according to claim 1, wherein the array substrate comprises:
 a first base substrate;
 a first anti-reflection layer located on the first base substrate; and
 a first metal layer located on one side of the first anti-reflection layer adjacent to the backlight module,
 wherein an orthographic projection of the first metal layer on the first base substrate is completely coincident with an orthographic projection of the first anti-reflection layer on the first base substrate, or located within the orthographic projection of the first anti-reflection layer on the first base substrate.

6. The display device according to claim 1, wherein the first light shielding layer comprises:
 an ink printing layer located between the first polarizer and the array substrate, wherein the ink printing layer is in contact with the first polarizer or the array substrate; or
 an ink printing layer located on one side of the first polarizer away from the array substrate.

7. The display device according to claim 1, wherein the display panel has a display area and a non-display area surrounding the display area, and the array substrate comprises:
 a first base substrate;
 a second anti-reflection layer located on the first base substrate;
 a second metal layer located on one side of the second anti-reflection layer away from the first base substrate; and
 a gate driving circuit located on one side of the second metal layer away from the first base substrate,
 wherein the second anti-reflection layer, the second metal layer and the gate driving circuit are all located in the non-display area, and a portion where orthographic projections of the second anti-reflection layer and the second metal layer on the first base substrate are coincident with each other at least partially covers an orthographic projection of the gate driving circuit on the first base substrate.

8. The display device according to claim 1, wherein the housing comprises: a rear portion located on one side of the backlight module away from the color film substrate and a plurality of side portions connected to the rear portion, and the plurality of side portions and the rear portion form an inner space of the housing;
 wherein the array substrate comprises:
 a first portion, wherein an orthographic projection of the first portion on the rear portion is completely or partially coincident with an orthographic projection of the color film substrate on the rear portion; and
 a second portion, wherein an orthographic projection of the second portion on the rear portion and the orthographic projection of the color film substrate on the rear portion are not coincident with each other,
 wherein an orthographic projection of the backlight module on the rear portion is completely coincident with an orthographic projection of the array substrate on the rear portion or located within the orthographic projection of the array substrate on the rear portion, and the second portion, the backlight module, the color film substrate and the side portion enclose an accommodating space; and the display module further comprises: a flexible circuit board located on one side of the second portion adjacent to the color film substrate, and a driving circuit board electrically connected to the flexible circuit board, wherein the driving circuit board and at least part of the flexible circuit board are arranged within the accommodating space.

9. A manufacturing method of a display device, comprising:
providing a display panel having a display area and a non-display area surrounding the display area, wherein the display panel comprises an array substrate and a color film substrate arranged opposite to each other, and the array substrate comprises a gate driving circuit located in the non-display area;
attaching a first polarizer to the array substrate, and forming a first light shielding layer on one side of the array substrate away from the color film substrate, wherein an orthographic projection of the first light shielding layer on the array substrate is located in the non-display area and at least partially covers the gate driving circuit;
binding a driving chip on the array substrate to which the first polarizer has been attached, and binding one end of a flexible circuit board on the array substrate and connecting another end of the flexible circuit board to a driving circuit board to form a display module; and
providing a housing and a backlight module, sequentially mounting the backlight module and the display module within the housing, and positioning the color film substrate between the array substrate and the backlight module;
wherein the display device further comprises: a photosensitive unit provided within the housing and located on one side of the color film substrate away from the array substrate, wherein the photosensitive unit is located in the non-display area;
wherein the display module further comprises: a second light shielding layer located on one side of the photosensitive unit adjacent to the color film substrate, and having a first hollowed-out area, wherein an orthographic projection of the light incident area of the photosensitive unit on the array substrate is at least partially coincident with an orthographic projection of the first hollowed-out area of the second light shielding layer on the array substrate; and
wherein the array substrate further comprises;
a plurality of first thin film transistors located in the non-display area and adjacent to one row or one column of first thin film transistors among the plurality of first thin film transistors which are located at an edge of the display area,
wherein at least one of the plurality of second thing film transistors does not comprise a drain metal layer or an active layer.

10. The manufacturing method according to claim 9, wherein a step of attaching a first polarizer on the array substrate and forming a first light shielding layer on one side of the array substrate away from the color film substrate comprises at least one of step a) to step f):
a) printing ink on a surface of one side of the array substrate away from the color film substrate to form an ink printing layer as the first light shielding layer, and attaching the first polarizer on an ink-printed side of the array substrate through an adhesive layer;
b) printing ink on a surface of the first polarizer to form an ink printing layer as the first light shielding layer, and attaching an ink-printed side of the first polarizer to a surface of one side of the array substrate away from the color film substrate through an adhesive layer;
c) attaching the first polarizer to a surface of one side of the array substrate away from the color film substrate through an adhesive layer, and printing ink on a surface of one side of the first polarizer away from the color film substrate to form an ink printing layer as the first light shielding layer, and then arranging a functional film layer on an ink-printed side of the first polarizer;
d) printing ink on a surface of the first polarizer to form an ink printing layer as the first light shielding layer, and providing a functional film layer on an ink-printed side of the first polarizer, and then attaching a surface of one side of the first polarizer away from the functional film layer to a surface of one side of the array substrate away from the color film substrate;
e) attaching a substrate comprising an ink printing layer as the first light shielding layer to a surface of the first polarizer, and attaching a surface of one side of the first polarizer away from the ink printing layer to a surface of one side of the array substrate away from the color film substrate; and
f) attaching the first polarizer to a surface of one side of the array substrate away from the color film substrate, and attaching a substrate comprising an ink printing layer as the first light shielding layer to a surface of one side of the first polarizer away from the array substrate.

11. The manufacturing method according to claim 9, further comprising:
arranging the photosensitive unit within the housing, and positioning the photosensitive unit on one side of the color film substrate away from the array substrate;
wherein a step of forming the display module further comprises:
forming a second light shielding layer on one side of the photosensitive unit adjacent to the color film substrate, wherein the second light shielding layer has a first hollowed-out area, and an orthographic projection of the light incident area of the photosensitive unit on the array substrate is at least partially coincident with an orthographic projection of the first hollowed-out area of the second light shielding layer on the array substrate.

12. The manufacturing method according to claim 9, wherein a step of forming the array substrate comprises:
providing a first base substrate;
forming a first anti-reflection layer on the first base substrate; and
forming a first metal layer on one side of the first anti-reflection layer away from the first base substrate, wherein an orthographic projection of the first metal layer on the first base substrate is completely coincident with an orthographic projection of the first anti-reflection layer on the first base substrate, or located within the orthographic projection of the first anti-reflection layer on the first base substrate.

13. The manufacturing method according to claim 12, wherein a step of forming the array substrate further comprises:
forming a second anti-reflection layer on the first base substrate;
forming a second metal layer on one side of the second anti-reflection layer away from the first base substrate; and
forming a gate driving circuit on one side of the second metal layer away from the first base substrate, wherein the second anti-reflection layer, the second metal layer and the gate driving circuit are all located in the non-display area, a portion where orthographic projections of the second anti-reflection layer and the second metal layer on the first base substrate are coincident with each other at least partially covers an orthographic projection of the gate driving circuit on the first base substrate.

14. The manufacturing method according to claim 13, wherein the first anti-reflection layer and the second anti-reflection layer are prepared by the same patterning process.

* * * * *

UNITED STATES PATENT AND TRADEMARK OFFICE
CERTIFICATE OF CORRECTION

PATENT NO. : 11,714,307 B2
APPLICATION NO. : 17/789459
DATED : August 1, 2023
INVENTOR(S) : Yang et al.

It is certified that error appears in the above-identified patent and that said Letters Patent is hereby corrected as shown below:

On the Title Page

Column 1, Page 2, item (57) Abstract, Line 1, delete "polarizer located" and insert -- polarizer is located --

In the Claims

Column 23, Line 36, Claim 1, delete "comprises;" and insert -- comprises: --

Column 23, Line 38, Claim 1, delete "non-display area;" and insert -- display area; --

Column 23, Line 44, Claim 1, delete "thing" and insert -- thin --

Column 25, Line 47, Claim 9, delete "comprises;" and insert -- comprises: --

Column 25, Line 48, Claim 9, after "the" insert -- display area; and a plurality of second thin film transistors located in the --

Column 25, Line 53, Claim 9, delete "thing" and insert -- thin --

Signed and Sealed this
Nineteenth Day of September, 2023

Katherine Kelly Vidal
*Director of the United States Patent and Trademark Office*